(12) United States Patent
Rumbo et al.

(10) Patent No.: US 7,003,383 B2
(45) Date of Patent: Feb. 21, 2006

(54) FLIGHT MANAGEMENT SYSTEM USING HOLDING PATTERN ENTRY ALGORITHMS

(75) Inventors: Jim R. Rumbo, Glendale, AZ (US);
Chad E. Gaier, Glendale, AZ (US);
John C. Hadley, Kentwood, MI (US);
Adib Bouanani, Surprise, AZ (US);
Gregory S. Hill, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/439,414

(22) Filed: May 15, 2003

(65) Prior Publication Data
US 2004/0230351 A1  Nov. 18, 2004

(51) Int. Cl.
*G05D 1/00* (2006.01)
*G06F 17/00* (2006.01)
(52) U.S. Cl. .............................. 701/3; 701/14; 701/202; 244/183
(58) Field of Classification Search .................... 701/3, 701/120–122, 14–16, 200–203, 205–207, 701/1, 4–5, 8, 12, 18; 244/75 R, 180–183, 244/76 R, 175; 33/158, 431; 116/DIG. 43; 340/945, 963–964, 971–972, 979–980; 73/178 R, 73/178 T; 715/771–772; 342/33–35
See application file for complete search history.

(56) References Cited

U.S. PATENT DOCUMENTS

| 4,154,190 | A | * | 5/1979 | Utgoff ........................ 116/335 |
| 5,214,855 | A | * | 6/1993 | Gibbs ......................... 33/1 SD |
| 5,553,387 | A | * | 9/1996 | Newcomb .................. 33/1 SD |
| 5,646,854 | A | * | 7/1997 | Bevan ........................ 701/206 |
| 6,163,744 | A | * | 12/2000 | Onken et al. ................ 701/3 |
| 6,167,627 | B1 | * | 1/2001 | Wilder et al. ............... 33/1 SD |
| 6,282,466 | B1 | * | 8/2001 | Nolte et al. .................. 701/11 |
| 6,349,258 | B1 | * | 2/2002 | Bonhoure et al. .......... 701/206 |
| 6,633,810 | B1 | * | 10/2003 | Qureshi et al. ............. 701/206 |

(Continued)

FOREIGN PATENT DOCUMENTS

WO  WO 02/25214 A2  3/2002

OTHER PUBLICATIONS

RTCA, Inc., Minimum Aviation System Performance Standards: Required Navigation Performance for Area Navigation from RTCA, Incorporated, 1140 Connecticut Avenue, N.W., Suite 1020, Washington, DC 20036-4001 USA. Sep. 13, 2000.

*Primary Examiner*—Jacques H. Louis-Jacques
(74) *Attorney, Agent, or Firm*—Andrew A. Abeyta

(57) ABSTRACT

The present invention provides a set of holding pattern entry algorithms used to define flight segments for entry into holding patterns. These geometries preferably describe the specific location and distance of various segments used in the holding pattern and holding pattern racetrack, with each segment defined as a curved or straight segment between endpoints. The algorithms also preferably include criteria used to determine entry extension, maximum initial turn angle, and minimum distance between a hold fix and an entry turn point. The geometry also preferably extends entry distance to avoid excessive iterative calculations. The algorithms are preferably utilized by a flight management system and method that determines segment sequencing during entry into holding patterns and the holding patterns themselves. The flight management system and method monitors the aircraft's progress along the active segment of the flight plan to determine what is the appropriate next segment in the algorithm and when to switch control from the active segment to the next segment.

15 Claims, 20 Drawing Sheets

U.S. PATENT DOCUMENTS

| | | | |
|---|---|---|---|
| 6,658,746 B1 * | 12/2003 | Ganivet | 33/1 SB |
| 6,664,945 B1 * | 12/2003 | Eich et al. | 345/156 |
| 6,678,587 B1 * | 1/2004 | Miller | 701/3 |
| 6,693,559 B1 * | 2/2004 | Gyde et al. | 340/974 |
| 6,707,475 B1 * | 3/2004 | Snyder | 715/771 |
| 2002/0193915 A1 | 12/2002 | Miller | 701/3 |

* cited by examiner

TYPE II DIRECT ENTRY REGION

TYPE II DIRECT ENTRY REGION

FLIGHT MANAGEMENT SYSTEM USING HOLDING PATTERN ENTRY ALGORITHMS

RELATED APPLICATIONS

This application is related to a co-pending U.S. patent application entitled "Flight Navigation Sequencing System and Method", Ser. No. 10/439,390, filed on May 15, 2003.

FIELD OF THE INVENTION

This invention generally relates to aviation, and more specifically relates to navigation systems.

BACKGROUND OF THE INVENTION

Modern aircraft rely on a wide range of navigational equipment to assist pilots in plotting and maintaining aircraft course. Many modern aircraft include with the navigation equipment flight management systems that automate navigation and aircraft control. These flight management systems assist pilots in following planned flight plans by providing direction and control to a series of course segments that make up the flight plan. In some cases, flight management systems pass flight plan information to the auto pilot system to facilitate flight control of the aircraft.

One issue flight management systems must address is the selection of flight plan segments. Flight management systems must be able to select the next segment in the flight plan and provide navigation directions that enable the pilot to control to and successfully enter the next segment.

This task is particularly problematic when the aircraft is required to enter into holding patterns. Holding patterns are designed to hold the aircraft in a designated area. The Federal Aviation Administration (FAA) defines several holding patterns that are commonly used in commercial aircraft. Recently, the RTCA has promulgated new performance standards for these holding patterns. These new performance standards require complex entry procedures that minimize the time and distance the aircraft spends outside the holding pattern.

Prior methods of entry into holding patterns and holding pattern entry algorithms are no longer acceptable under the new standards. The new method of holding pattern entry requires a more complex entry path. Thus, what is needed are improved holding pattern entry algorithms.

BRIEF SUMMARY OF THE INVENTION

The present invention provides a set of holding pattern entry algorithms used to define flight segments for entry into holding patterns. These geometries preferably describe the specific location and distance of various segments used in the holding pattern and holding pattern racetrack, with each segment defined as a curved or straight segment between endpoints. The algorithms also preferably include criteria used to determine entry extension, maximum initial turn angle, and minimum distance between a hold fix and an entry turn point. The geometry also preferably extends entry distance to avoid excessive iterative calculations.

The algorithms are preferably utilized by a flight management system and method that determines segment sequencing during entry into holding patterns and the holding patterns themselves. The flight management system and method monitors the aircraft's progress along the active segment of the flight plan to determine what is the appropriate next segment in the algorithm and when to switch control from the active segment to the next segment.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

Figure 1:
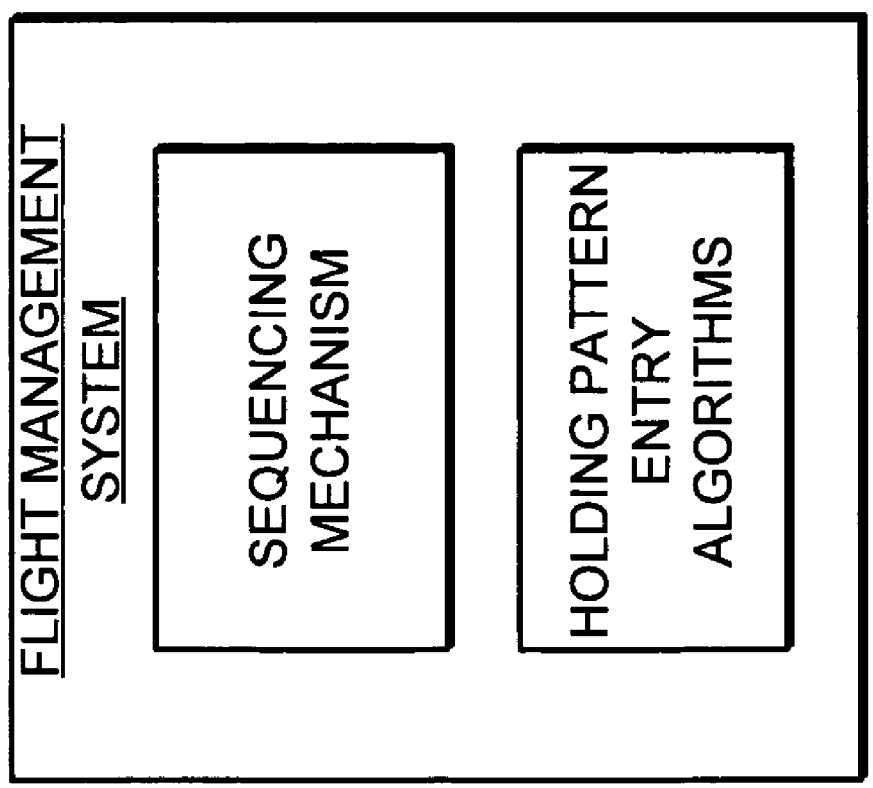
FIG. 1 is a schematic view of flight management system.

The present invention provides a set of holding pattern entry algorithms used to define flight segments for entry into holding patterns. These geometries preferably describe the specific location and distance of various segments used in the holding pattern and holding pattern racetrack, with each segment defined as a curved or straight segment between endpoints. The algorithms also preferably include criteria used to determine entry extension, maximum initial turn angle, and minimum distance between a hold fix and an entry turn point. The geometry also preferably extends entry distance to avoid excessive iterative calculations.

The present invention is preferably utilized by a flight management system and method that determines segment sequencing during entry into holding patterns and the holding patterns themselves. The flight management system and method monitors the aircraft's progress along the active segment of the flight plan to determine what is the appropriate next segment and when to switch control from the active segment to the next segment. Specifically, the flight management system and method tracks the position of the aircraft along the active segment of the flight plan. When the aircraft approaches a holding pattern the flight management system determines the inbound delta, the difference between the hold orientation and the previous leg course. From the inbound delta, the flight management system determines the hold entry type for the entry into the holding pattern. For each hold entry type, the flight management system includes a holding pattern entry algorithm that defines a series of entry segments for that entry type and the control and capture criterion used to evaluate and select those entry segments. With the holding entry type determined, the flight management system evaluates each segment in the associated holding pattern entry algorithm to determine if that segment meets the control and capture criteria. Each segment is evaluated in the order determined by the holding pattern entry algorithm. If none of the segments meet the criteria, then a default entry segment is selected and controlled to. With the first segment selected, the flight management system controls to that segment until the criteria in the holding pattern entry algorithm are met for sequencing to a next segment. This process continues, with the flight management system guiding the aircraft into the holding pattern.

The flight system and method can use a range of criteria to determine the next segment that is appropriate to control to. These criteria can include aircraft position relative to a wayline, the existence of any cross track error, and whether or not the projected aircraft track will intersect an active segment. For example, the flight management system can evaluate the aircraft state parameters at each wayline crossing to determine which segment is appropriate to control to next. If none of the segments are appropriate, then the control is defaulted to a default segment.

Turning now to FIG. 1, a flight management system 100 is illustrated schematically. The flight management system 100 includes a sequencing mechanism and a plurality of holding pattern entry algorithms. The sequencing mechanism provides segment sequencing during entry into holding patterns and the holding patterns themselves. The holding pattern entry algorithms each define series of entry segments and the control and capture criterion used to evaluate and select those entry segments. The flight management system and method monitors the aircraft's progress along an active segment of the flight plan and uses the sequencing mechanism and holding pattern algorithms to determine what is the appropriate next segment and when to switch control from the active segment to the next segment. Typically, the flight management system determines the holding entry type and then uses the sequencing system to evaluate each segment in the associated holding pattern entry algorithm to determine if that segment meets the control and capture criteria. With the first segment selected, the flight management system controls to that segment until the criteria in the holding pattern entry algorithm are met for sequencing to a next segment. This process continues, with the flight management system guiding the aircraft into the holding pattern.

Figure 2:
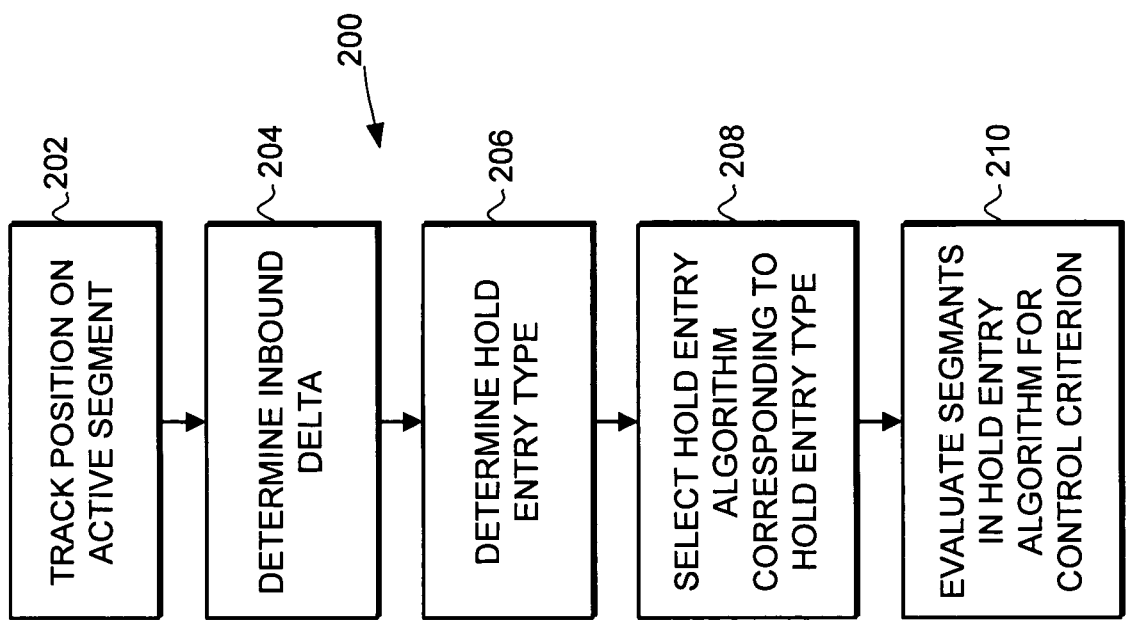
FIG. 2 is a flow diagram of a flight sequencing method.

Turning now to FIG. 2, a method 200 for determining entry into a holding pattern is illustrated. The method 200 provides segment sequencing during entry into holding patterns and the holding patterns themselves to facilitate proper entry into the holding pattern.

The first step 202 is to track position on the active segment. This comprises determining the position of the aircraft along the current flight plan segment prior to the hold entry. The position of the aircraft along the current flight plan can be determined by the FMS using any suitable navigational equipment.

The next step 204 is to determine the inbound delta to the holding pattern. The inbound delta of the holding pattern is the difference between the hold orientation of the holding pattern and the current leg course. Thus, the inbound delta gives the angle of entry into the holding pattern.

Figure 3:
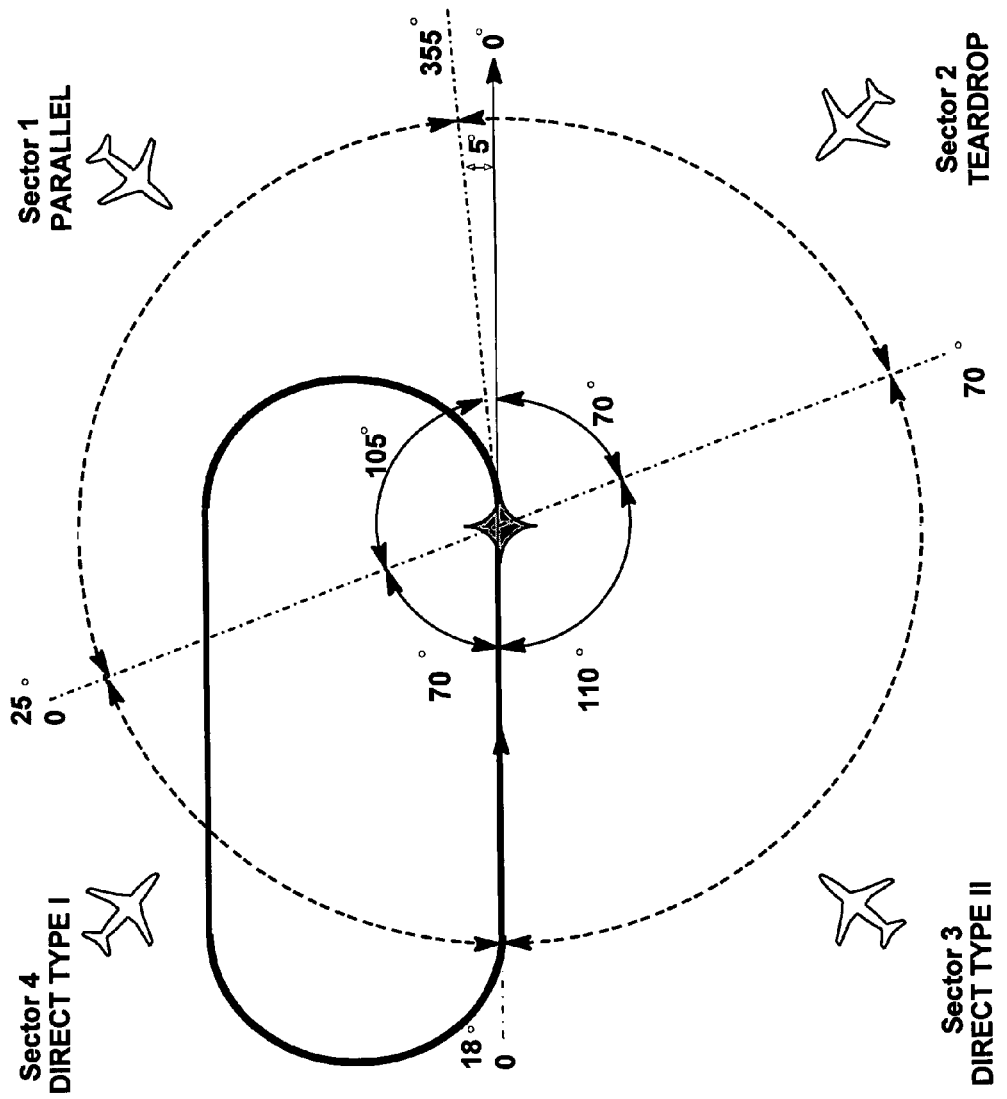
FIG. 3 a schematic diagram illustrating a holding pattern and the general types of entry into the holding pattern.

The next step 206 is to determine the hold entry type. The hold entry type is based on the inbound delta determined in step 204. In holding patterns, there are four general types of hold entries. These four general types are Parallel, Tear Drop, Direct Type II and Direct Type I, with each of the hold entry types covering a different range of inbound deltas. Turning briefly to FIG. 3, a schematic view illustrating a holding pattern and the general types of entry into the holding pattern. The entry patterns are defined according to what sector of entry is used when compared to the holding pattern. The Parallel entry type comprises those entries that occur in the 105° area of sector 1. The Tear Drop entry type comprises those entries that occur in the 70° area of sector 2. The Direct Type II entry type comprises those entries that occur in the 110° area of sector 3. Finally, the Direct Type I entry type comprises those entries that occur in the 70° area of sector 4.

Returning to method 200, with the hold entry type determined, the next step 208 is to select a hold entry algorithm corresponding to the hold entry type. The holding pattern entry algorithms each define series of entry segments and the control and capture criterion used to evaluate and select those entry segments. The details of preferred holding pattern entry algorithms will be discussed with reference to FIGS. 4–15.

With hold entry algorithm selected, the next step 210 is to evaluate the flight plan segments in the hold entry algorithm for control criterion. Preferably, each segment is evaluated in the order determined by the holding pattern entry algorithm. If none of the segments meet the criteria, then a default entry segment is selected and controlled to. With the first segment selected, the flight management system controls to that segment until the criteria in the holding pattern entry algorithm are met for sequencing to a next segment. This process continues, with the flight management system guiding the aircraft into and through the holding pattern. It should be noted that in some embodiments, when a segment has been used in the entry, the segment is locked out such that the FMS does not need to evaluated it again.

Figure 5:
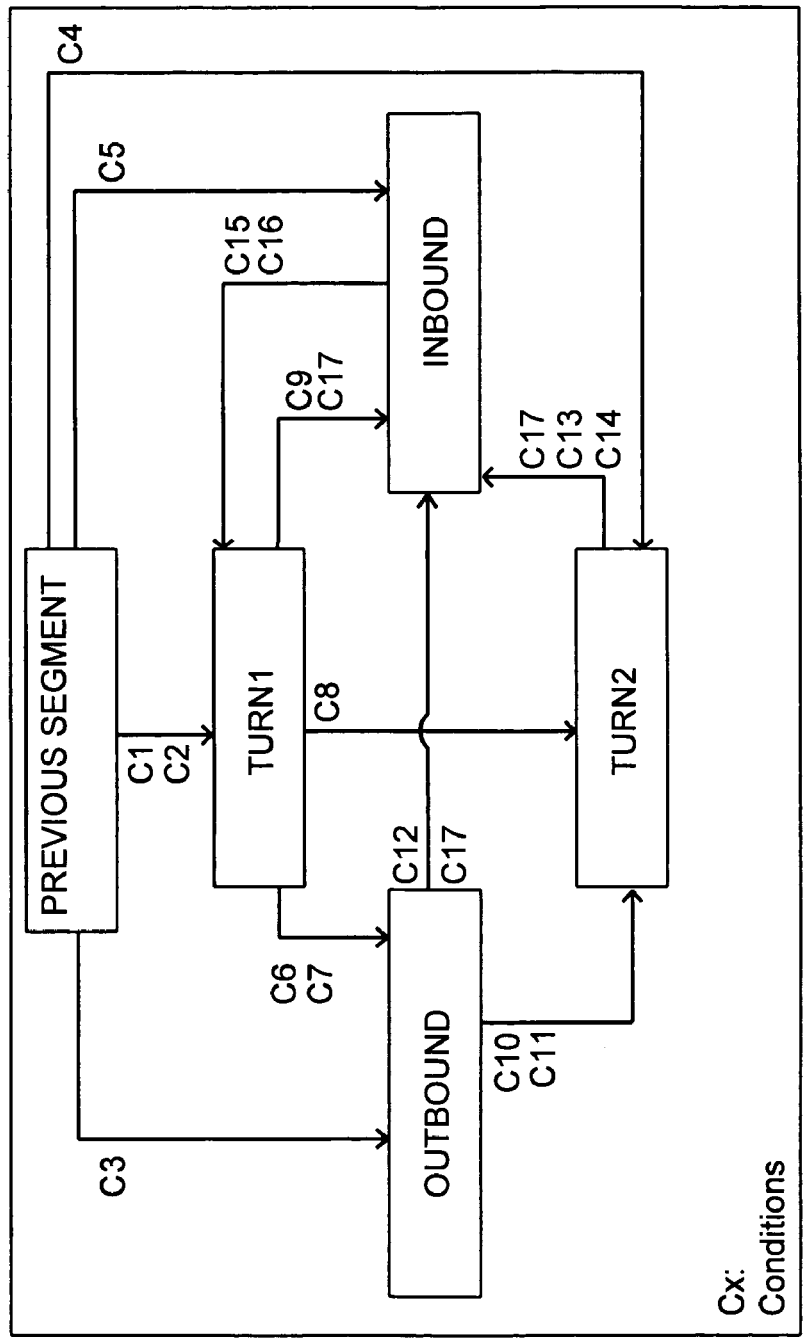
FIG. 5 is flow diagram illustrating a sequencing method for a racetrack holding pattern.
Figure 8:
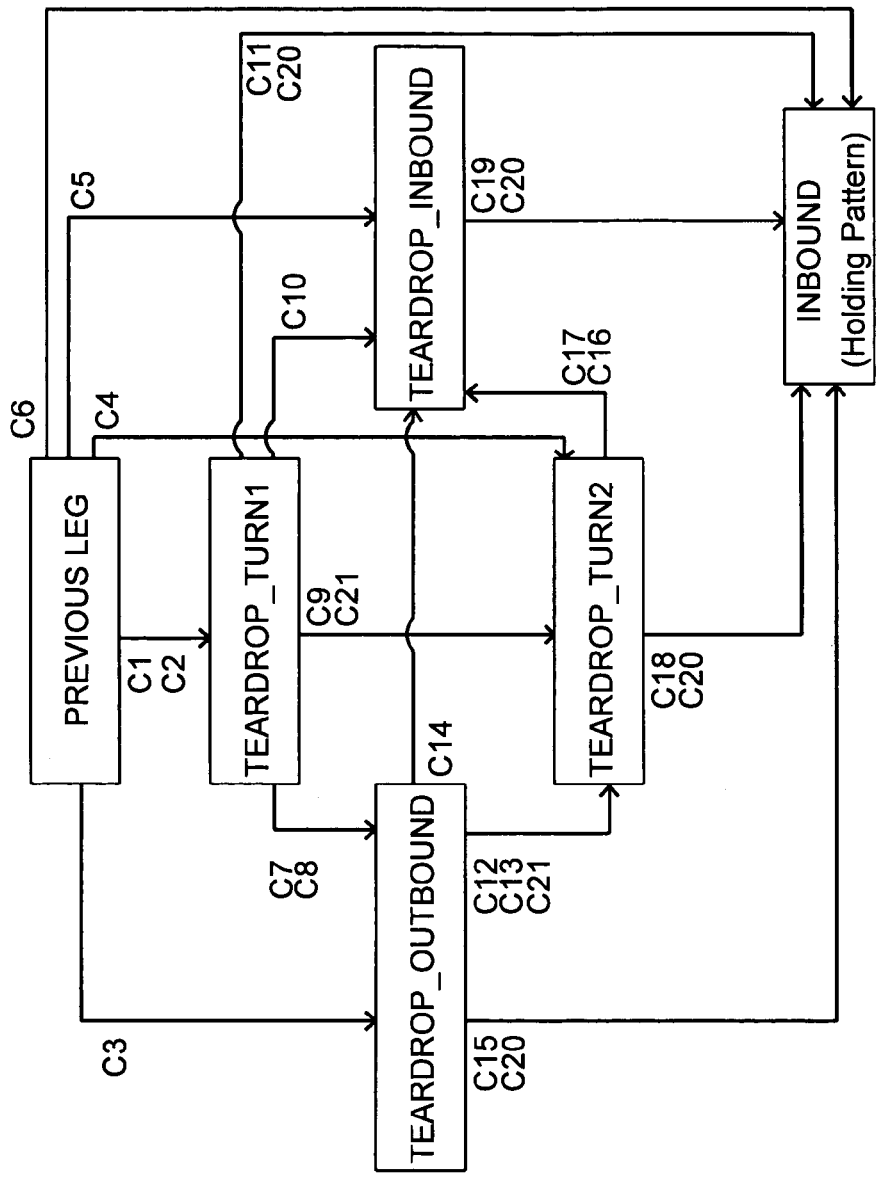
FIG. 8 is a flow diagram illustrating a sequencing method for teardrop holding pattern entry.
Figure 11:
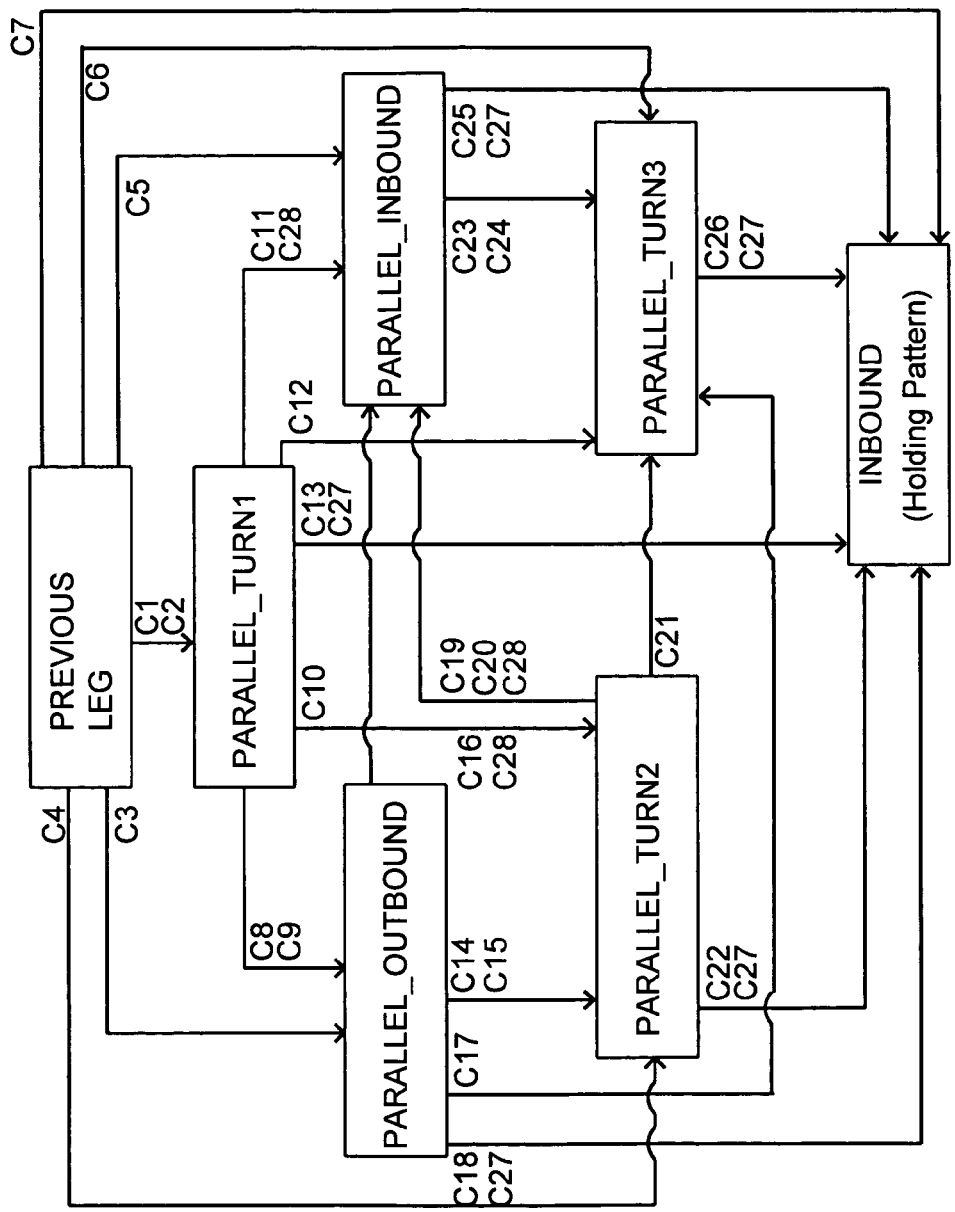
FIG. 11 is a flow diagram illustrating a sequencing method for a parallel holding pattern entry.
Figure 13:
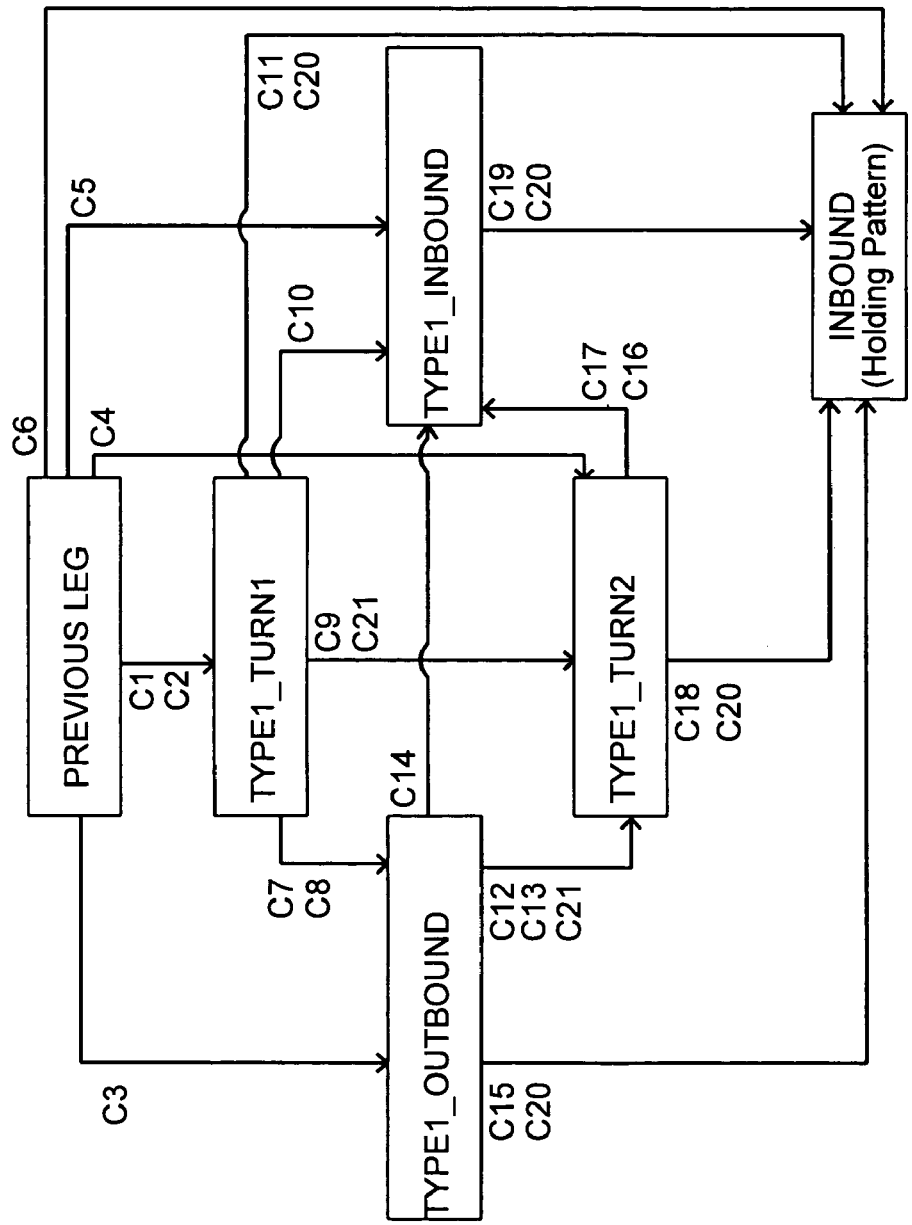
FIG. 13 is a flow diagram illustrating a sequencing method for a type 1 direct holding pattern entry.
Figure 15:
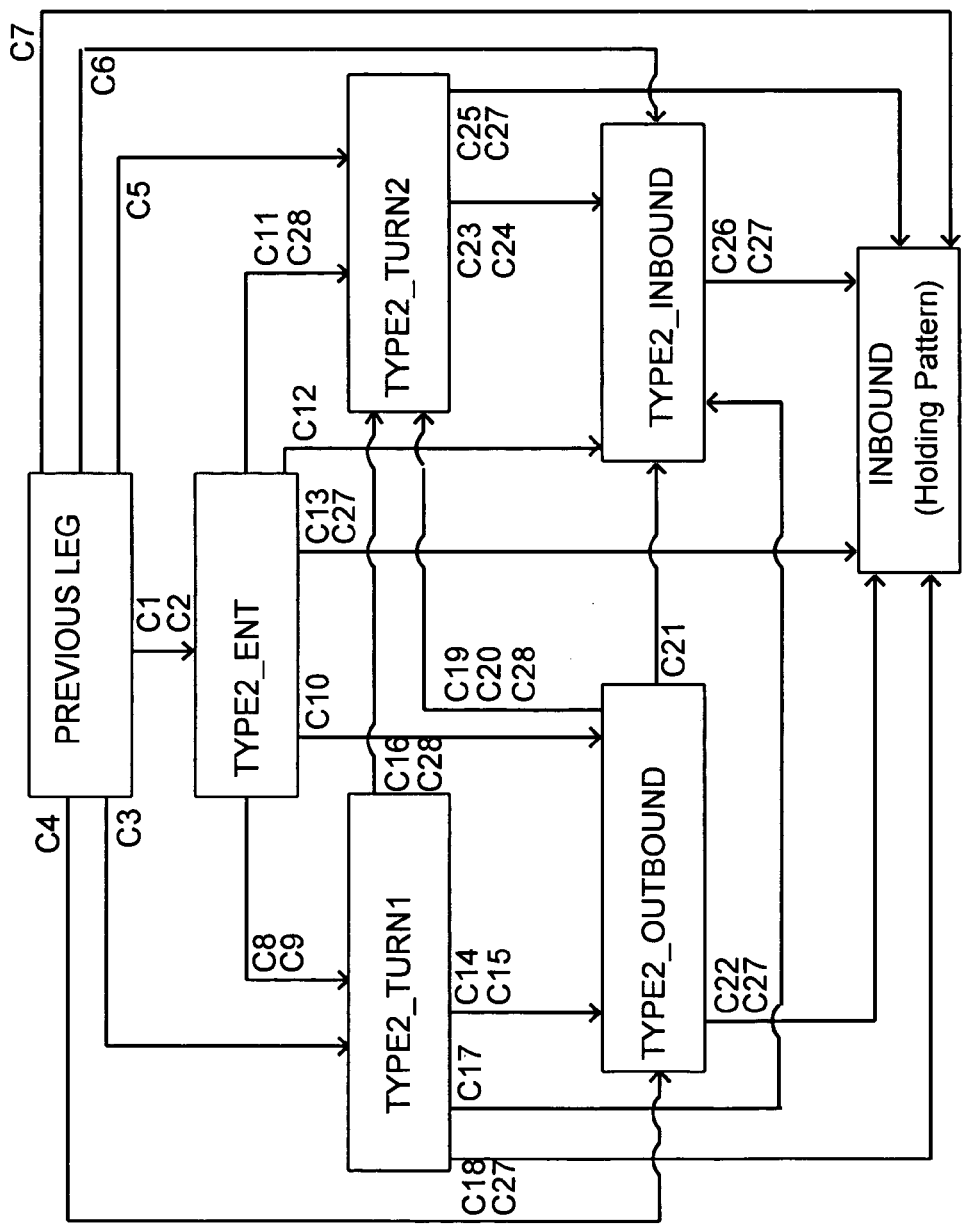
FIG. 15 is a flow diagram illustrating a sequencing method for a type 2 direct holding pattern entry.

A detailed example of holding pattern entry segment sequencing will now be described. This detailed example illustrates systems and methods that can be used to evaluate segments in the hold entry algorithm for control criterion. Included in this example are five sequencing diagrams that each illustrates sequencing decision making criteria. Specifically, FIG. 5 illustrates a sequencing method for a race track holding pattern. FIGS. 8, 11, 13 and 15 each illustrate a sequencing method for holding pattern entry. Specifically, FIG. 8 illustrates a sequencing method for a teardrop holding entry, FIG. 11 illustrates a sequencing method for a parallel hold entry, FIG. 13 illustrates a sequencing method for a Type 1 hold entry, and FIG. 15 illustrates a sequencing method for a Type II hold entry.

In general, the flight management system and method uses one of the four entry sequencing methods to determine an entry course into the holding pattern, and then uses the holding pattern sequence illustrated in FIG. 5 for the holding pattern itself. It should also be noted that in general the sequencing methods and conditions used to implement the sequencing method are selected to have control sequence automatically to the next segment when the aircraft is under control of the FMS.

If the aircraft is not under active control of the FMS, then the system attempts to determine the most likely appropriate next segment to control to based on the current location and heading of the aircraft. This information can then be displayed or otherwise provided to the pilot allowing the pilot to choose whether or not to follow this sequencing procedure. In this case, the FMS controls to the next segment by informing the pilot through the display of cross track error to the active segment. In general, the system will control to the next segment when the aircraft is following the current segment within a specified margin of error. Thus, the FMS will assume that the pilot is intending to follow the holding pattern and inform the pilot of the flight plan sequencing needed to track to the holding pattern. In the following specific implementations, this is implemented by prescribing conditions to sequence that cause sequencing to occur when the aircraft is within a prescribed perpendicular distance to the active segment. Furthermore, the method will also sequence to the segment if the when the aircraft exceeds the prescribed distance, but is within another distance and is also on track to intercept the next segment of the holding pattern. Thus, in both cases the FMS will assume the pilot intends to follow the holding pattern and prescribe sequencing to following the holding pattern. Finally, if the aircraft is not within the greater distance of the aircraft track, the FMS will default and sequence to a default segment. If none of these conditions exist, the FMS will generally simply display a message such as NOT ON INTERCEPT HEADING.

Figure 4:
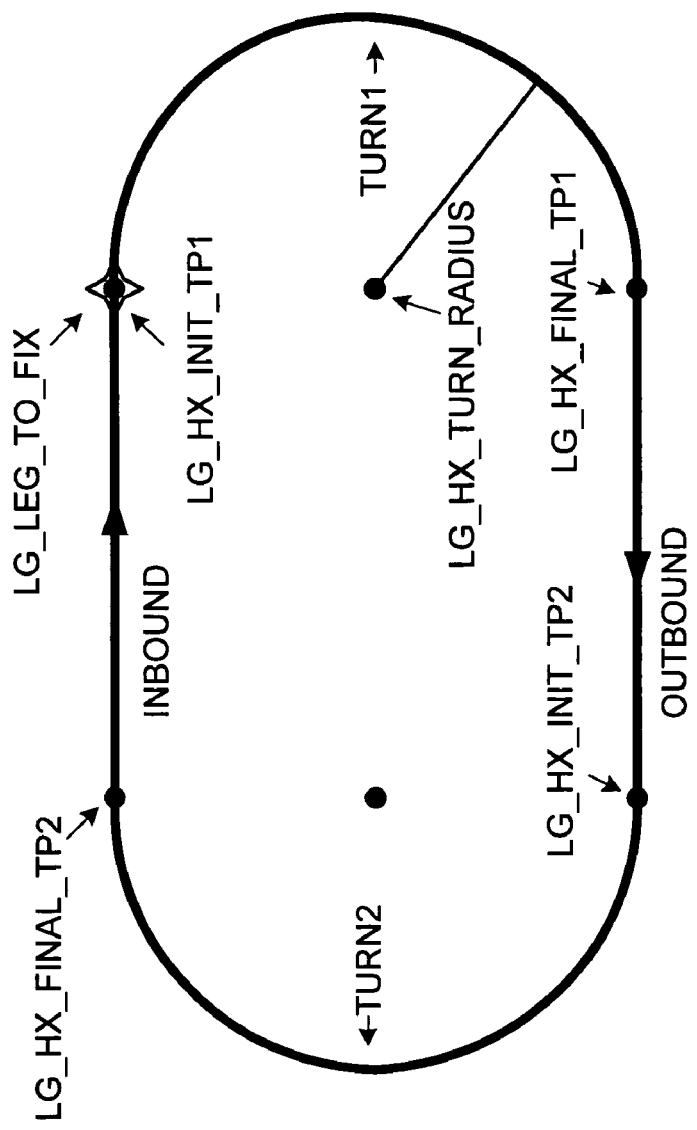
FIG. 4 is a schematic diagram illustrating a exemplary holding pattern geometry.

Turning now to FIG. 4, an exemplary holding pattern geometry and some associated parameters are illustrated. The holding pattern includes four segments, TURN1, OUTBOUND, TURN2 and INBOUND. The segment TURN1 is a curved segment between endpoints LG_HX_INIT_TP1 and LG_HX_FINAL_TP1. The segment OUTBOUND is a straight segment between LG_HX_FINAL_TP1 and LG_HX_INIT_TP2. The segment TURN2 is the curved segment between endpoints LG_HX_INIT_TP2 and LG_HX_FINAL_TP2. Finally, the segment INBOUND is a straight segment between endpoints LG_HX_FINAL_TP2 and LG_HX_INIT_TP1. The segments TURN1 and TURN2 are defined by the radius of LG_HX_TURN_RADIUS.

FIG. 4 thus illustrates a typical race track holding pattern, and can be used in both hold-to-altitude (HA) or hold-to-manual (HM) applications. The holding pattern defines a controllable flight plan that puts the aircraft into a defined area. Returning to FIG. 5, a sequencing method 500 for the race track holding pattern is illustrated. In method 500, the aircraft begins at a PREVIOUS SEGMENT. The PREVIOUS SEGMENT will be defined by the current aircraft location, and will typically result from the use of one of the four entry pattern methods that will be discussed with reference to FIGS. 9, 11, 13 and 15.

Starting at the PREVIOUS SEGMENT, the FMS will sequence control to either TURN1, OUTBOUND, TURN2, or INBOUND SEGMENT, depending on which condition C1–C5 is met. For example, if condition C1 or C2 is met, the sequencing method controls to TURN1. Conversely, if condition C3 is met, the sequencing method controls to OUTBOUND. If condition C4 is met, the sequencing method controls to TURN2. Finally, if condition C5 is met, the sequencing method controls to INBOUND. It should be noted that the conditions are preferably evaluated in order, and that the first condition that is met controls what segment will be controlled to next.

After passing to the next segment, the FMS will continue to sequence to new segments when the appropriate conditions are met. For example, if the current segment is TURN1, the FMS will sequence to OUTBOUND if condition C6 or C7 is met, sequence to TURN2 if condition C8 is met, and sequence to INBOUND if C9 or C17 is met. Eventually, the aircraft will begin to sequencing in the racetrack order (i.e., TURN1, OUTBOUND, TURN2, INBOUND) and will continue to do so until the appropriate time to leave the holding pattern.

It general the conditions used to implement method 500 are selected to have control sequence automatically to the next segment when under control of the FMS. Additionally, control sequences to the next segment when the aircraft crosses a wayline and is within a prescribed distance of the previous segment, where a "wayline" is defined as a line perpendicular to the aircraft path that indicates the end of the current segment. Finally, control also sequences if the aircraft exceeds the prescribed distance, but is within another distance and is ontrack to intersect the next segment.

Examples of conditions that may be used to implement method 500 are listed in Appendix 1. These conditions evaluate the location of the aircraft according to several variables. These variables include whether or not the navigation system is actively controlling the aircraft (i.e., whether the LNAV is engaged or disengaged), the cross-track error, defined as the perpendicular distance from the aircraft to the active segment, (LG_XTRE), the distance remaining to the next wayline (LEG_DIST_SEGMENT_TO_GO), the turn radius of the holding pattern (LG_HX_TURN_RADIUS), the segment of the holding pattern that the aircraft is on track to intersect (LEG_SEG_ON-TRACK_TO), and whether or not the pilot has armed the hold to exit at the fix (LG_HOLD_SEQUENCE_ARMED).

As an example, if the current segment is the OUTBOUND segment, the FMS will sequence to TURN2 if conditions C10 or C11 are met, and to INBOUND if conditions C12 or C17 are met. Condition C12 is met when the navigation system is disengaged, the cross track error is greater than one holding pattern radius, and less than 21 nautical miles, and the aircraft is on track to intersect the INBOUND segment. Condition C17 is met if the LNAV is disengaged and the cross track error is greater than 21 nautical miles. Condition C10 is met if the LNAV is engaged, and the distance to the next wayline is less than zero. Condition C11 is met if the LNAV is disengaged and either the distance to the wayline is less than zero and the cross track error is less than one holding patter radius, or if the cross track error is greater than one radius and less than 21 nm and the aircraft is ontrack to intersect turn 2.

Again, in general these conditions operate such that control automatically sequences to the next segment when a wayline is crossed and the LNAV is engaged and thus the aircraft is under the control of the FMS (e.g., C1, C6, C10, C13, C15). Also, in general the system sequences to the next segment when a wayline is crossed and the cross track error is less than one holding pattern radius of the current segment (e.g., C2, C7, C11, C14). In general, the system also sequences when the cross track error is greater than one holding pattern radius, but less than 21 nautical miles, and the aircraft is on track to intersect the next segment (e.g., C2, C3, C4, C5, C6, C7, C8, C9, C11, C12 and C14). The system will also sequence in some cases when the pilot has not armed the hold to exit at the fix and intends to continue flying the hold (e.g., C15 and C16). Finally, if the distance is greater than 21 nm, the system sequences to the INBOUND segment as a default.

Figure 6:
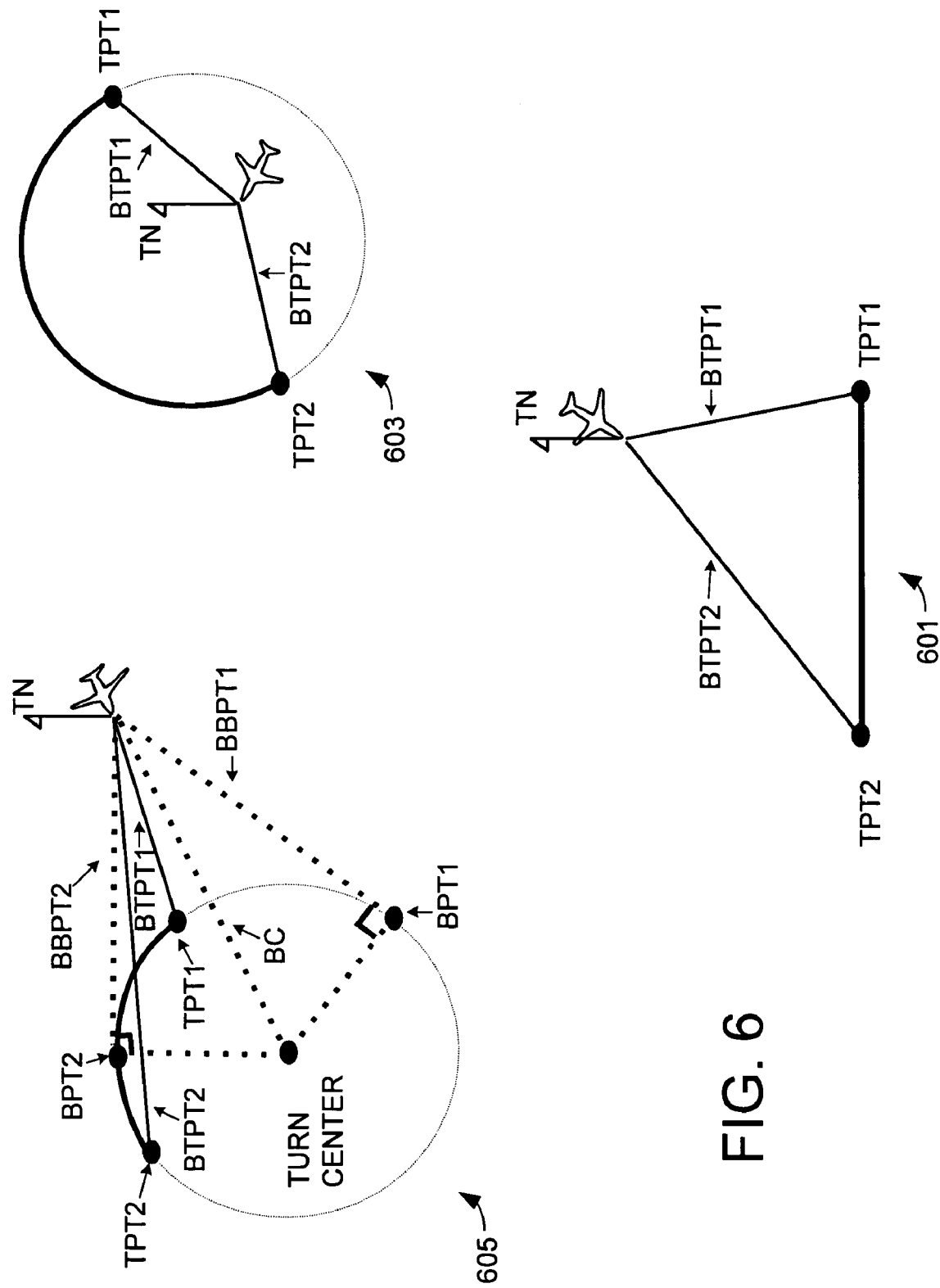
FIG. 6 is schematic diagram illustrating three examples of aircraft on track to intersect a flight plan segment.

Turning briefly to FIG. 6, three examples are illustrated of an aircraft on track to intersect a flight plan segment. In each case for straight segments or curved, the aircraft is on track to intersect the segment if the track will intersect any point on the segment. In example 601, the example is shown illustrating a straight segment between endpoints TPT1 and TPT2. If the aircraft heading is between BTPT1 and BTPT2, the aircraft is on track to intersect the segment. Likewise, in example 603 if the aircraft heading is between BTPT1 and BTPT1 the aircraft is on track to intersect the curved segment between endpoints TPT1 and TPT2. Example 605 illustrates that an aircraft can be headed away from the area between the endpoints TPT1 and TPT2 and still intersect a curved segment, such as at the waypoint BPT2. Thus, the sequencing system can determine if the aircraft is ontrack to insert a segment by computing an angle that spans a first endpoint of the segment, a second endpoint of the segment, and a tangent line of the segment. If the aircraft heading is within the angle formed between the two endpoints and the tangent line, then the aircraft is ontrack to insect the segment.

Figure 7:
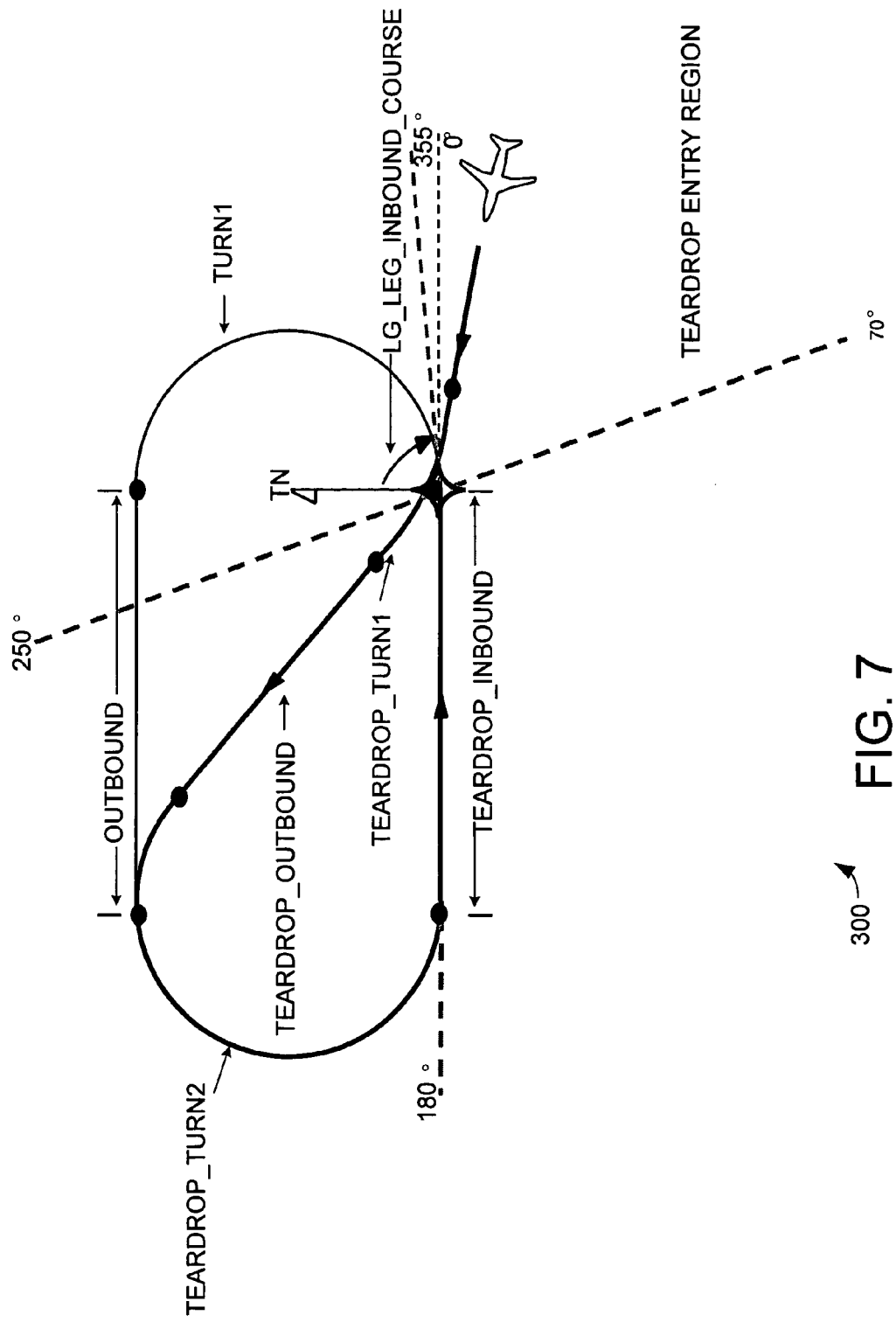
FIG. 7 is a schematic diagram of a exemplary teardrop holding pattern entry geometry.

Turning now to FIG. 7, an exemplary teardrop holding entry geometry and some associated parameters are illustrated. The teardrop holding pattern entry geometry includes five segments, TEARDROP_TURN1, TEARDROP_OUTBOUND, TEARDROP_TURN2, and TEARDROP_INBOUND. Again, each segment is defined as a curved or straight segment between endpoints.

Turning now to FIG. 8, a sequencing method 800 for teardrop entry pattern is illustrated. the race track holding pattern is illustrated. In method 800, the aircraft begins at a PREVIOUS LEG. The PREVIOUS LEG will be defined by the current aircraft location within the boundaries of the teardrop entry region.

Starting at the PREVIOUS LEG, the FMS will sequence control to either TEARDROP_TURN1, TEARDROP_OUTBOUND, TEARDROP_TURN2, TEARDROP_INBOUND or INBOUND depending on which condition C1–C6 is met. For example, if condition C1 or C2 is met, the sequencing method controls to TEARDRO_TURN1. Conversely, if condition C3 is met, the sequencing method controls to TEARDROP_OUTBOUND. If condition C4 is met, the sequencing method controls to TEARDROP_TURN2. If condition C5 is met, the sequencing method controls to TEARDROP_INBOUND. Finally, if condition C6 is met, the sequencing method controls to the INBOUND.

From there, the FMS will continue to sequence to new segments when the appropriate conditions are met. This sequencing method is designed to guide the aircraft from the tear drop region and on to the holding pattern. When the entry is completed, the sequence is passed to INBOUND and the FMS sequences through the holding pattern as described with reference to method 500.

For example, the FMS will sequence to TEARDROP_TURN1 if condition C1 is met, will then sequence to TEARDROP_OUTBOUND if condition C7 is met, will then sequence to TEARDROP_TURN2 if condition C12 is met, will then sequence to TEARDROP_INBOUND if condition C16 is met, and finally will sequence to the holding pattern if condition C19 is met. This sequence is that example illustrated in FIG. 7. Of course, other sequences would occur depending on the conditions met.

Again, in general the conditions used to implement method 800 are selected to have control sequence automatically to the next segment when under control of the FMS (e.g. LNAV is engaged). The system in general uses wayline sequencing when the LNAV system is disengaged and the aircraft is within a prescribed distance (e.g., within one radius). Finally, control also sequences if the aircraft exceeds the prescribed distance (e.g. one radius) but is within another distance (e.g., 21 nautical miles) and is ontrack to intercept the next segment.

For the HA and HM Teardrop Entry, when none of the segments are acceptable for sequencing then the hold INBOUND leg becomes the active segment and the original entry is removed. For the HF teardrop entry the TEARDROP_TURN2 becomes the active segment until sequencing into the CF leg when none of the segments are acceptable for capture.

Examples of conditions that may be used to implement method 800 are listed in Appendix 2. These conditions evaluate the location of the aircraft according to several variables, and include the same variables used in appendix 1.

It should be noted that conditions C5, C6, C10, C11, C14, C15, C16, C17, and C18 are true for the HA and HM hold entry but not the HF leg hold entry. The Procedure Hold is constructed as two consecutive legs, the HF leg and CF leg (Inbound leg). The HF ends at the conditional waypoint INBD where the TEARDROP_TURN2 intercepts the CF leg.

Figure 9:
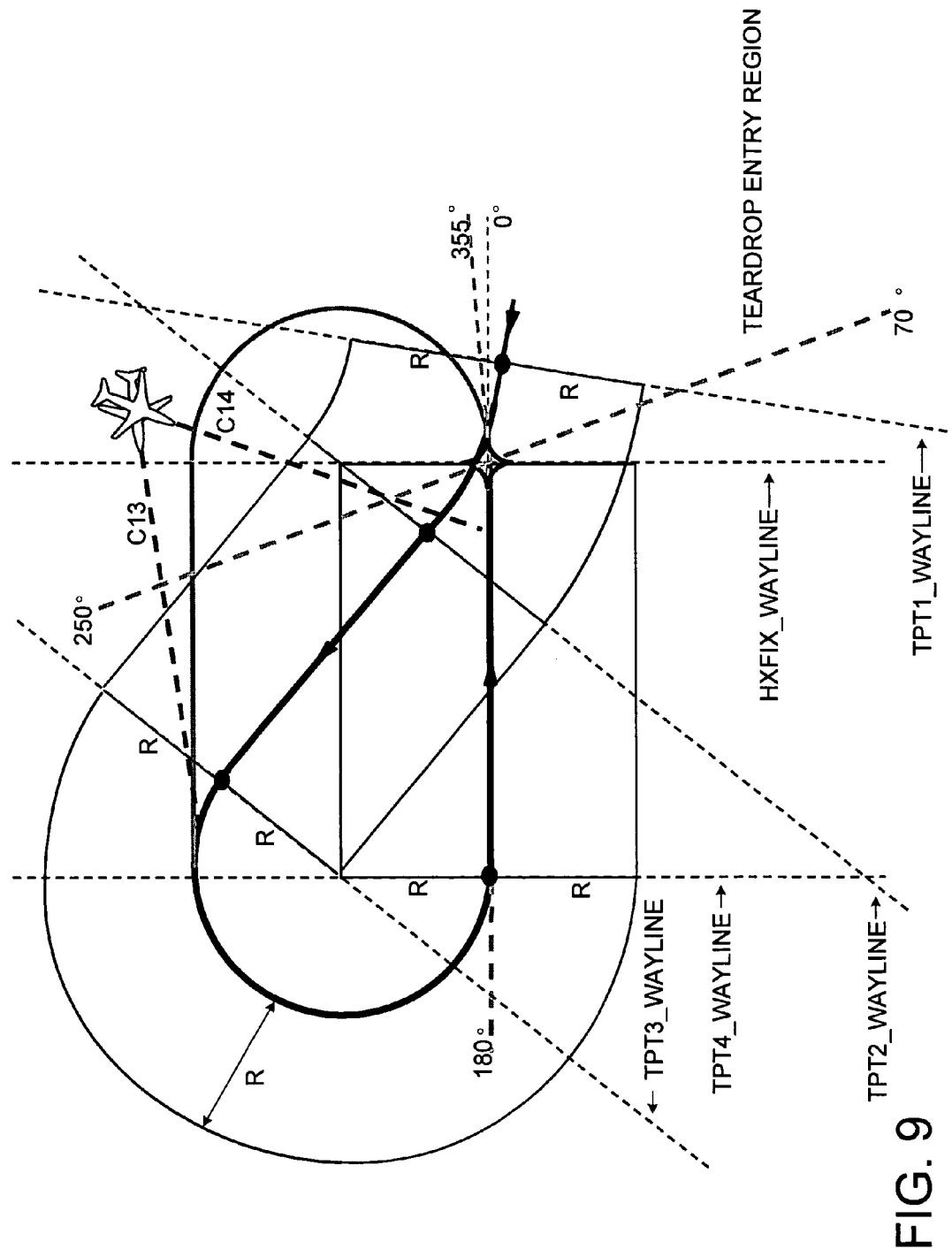
FIG. 9 is a schematic diagram of the exemplary teardrop holding entry geometry showing the waylines that exist between segments.

Turning now to FIG. 9, the exemplary teardrop holding entry geometry is illustrated showing the waylines that exist between segments. Also illustrated is the path created by limiting suitable cross track error to the radius of the holding pattern. This figure illustrates the one turn-radius boundary that is used for the sequencing criteria.

Figure 10:
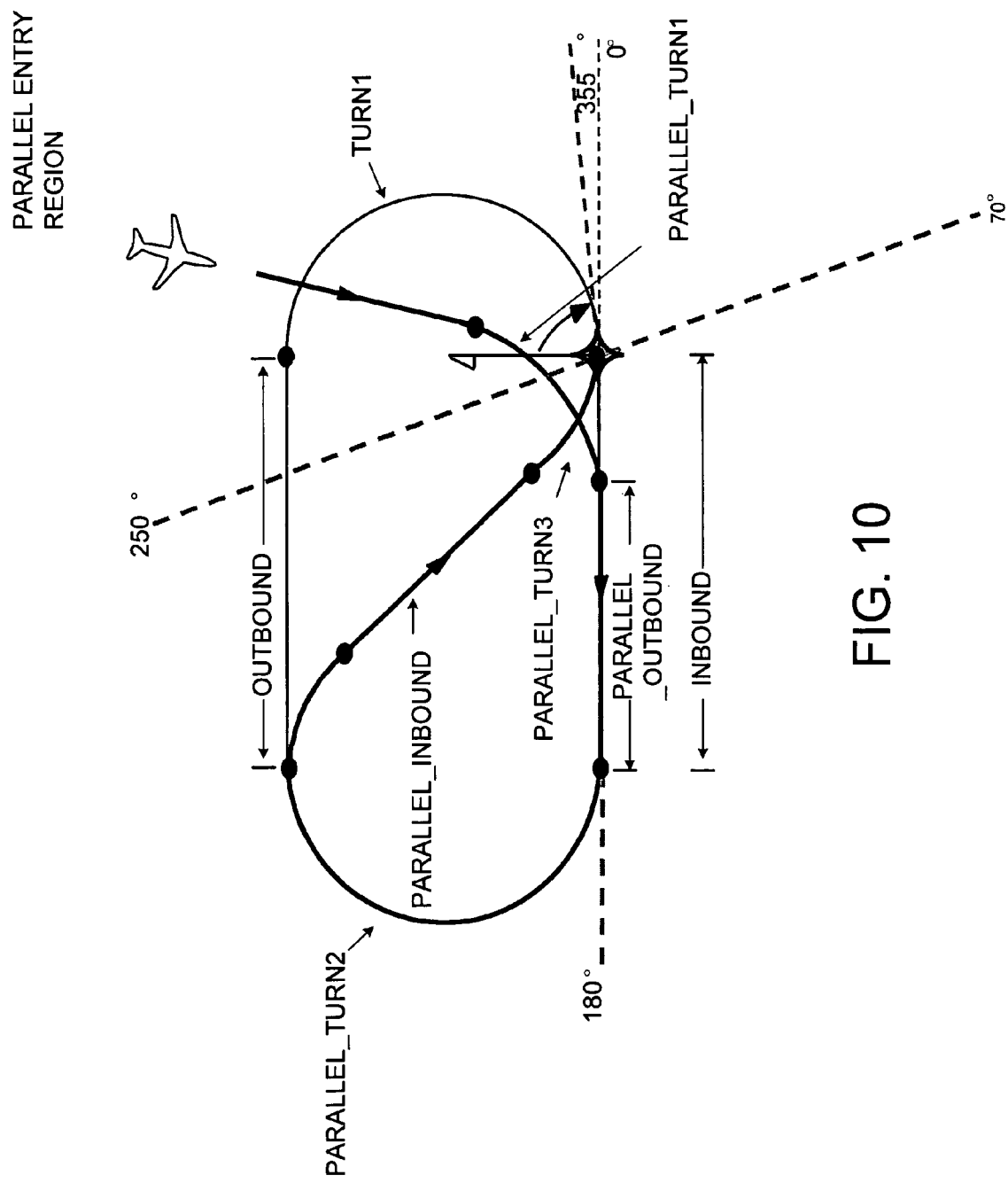
FIG. 10 is a schematic diagram of a exemplary parallel holding pattern entry geometry.

Turning now to FIG. 10, an exemplary parallel holding entry geometry and some associated parameters are illustrated. The parallel holding pattern entry geometry includes five segments, PARALLEL_TURN1, PARALLEL_OUTBOUND, PARALLEL_TURN2, PARALLEL_INBOUND, and PARALLEL_TURN3. Again, each segment is defined as a curved or straight segment between endpoints.

Turning now to FIG. 11, a sequencing method 1100 for parallel entry pattern is illustrated. In method 1100, the aircraft again begins at a PREVIOUS LEG. The PREVIOUS LEG will be defined by the current aircraft location within the boundaries of the parallel entry region.

Starting at the PREVIOUS LEG, the FMS will sequence control to either PARALLEL_TURN1, PARALLEL_OUTBOUND, PARALLEL_TURN2, PARALLEL_INBOUND, PARELLEL_TURN3 or INBOUND depending on which condition C1–C8 is met. For example, if condition C1 or C2 is met, the sequencing method controls to PARALLEL_TURN1. Conversely, if condition C3 is met, the sequencing method controls to PARALLEL_OUTBOUND. If condition C4 is met, the sequencing method controls to PARALLEL_TURN2. If condition C5 is met, the sequencing method controls to PARALLEL_INBOUND. If condition C6 is met, the sequencing method controls to the PARALLEL_TURN3. Finally, if condition C7 is met, the sequencing method controls to INBOUND.

From there, the FMS will continue to sequence to new segments when the appropriate conditions are met. This sequencing method is designed to guide the aircraft from the tear drop region and on to the holding pattern. When the entry is completed, the sequence is passed to INBOUND and the FMS sequences through the holding pattern as described with reference to method 500.

Again, in general the conditions used to implement method 1100 are selected to have control sequence automatically to the next segment when under control of the FMS. Additionally, control sequences to the next segment when the aircraft crosses a wayline and is within a prescribed distance of the previous segment. Finally, control also sequences if the aircraft exceeds the prescribed distance, but is within another distance and is ontrack to the next segment. For the HA and HM Parallel Entry, when none of the segments are acceptable for capture (the track of the aircraft does not intercept the segments) then the hold INBOUND leg becomes the active segment and the original entry is removed, for the HF Parallel entry the PARALLEL_TURN3 becomes the active segment until sequencing into the CF leg when none of the segments are acceptable for capture.

Examples of conditions that may be used to implement method 1100 are listed in Appendix 3. Conditions C6, C7, C12, C13, C17, C18, C21, C22, and C25 are true for t HA and HM hold entry but not the HF leg hold entry. The Procedure Hold is constructed as two consecutive legs, the HF leg and CF leg (Inbound leg). The HF ends at the conditional waypoint INBD where the bisector of PARALLEL_TURN3 intercept the CF leg (inbound).

Figure 12:
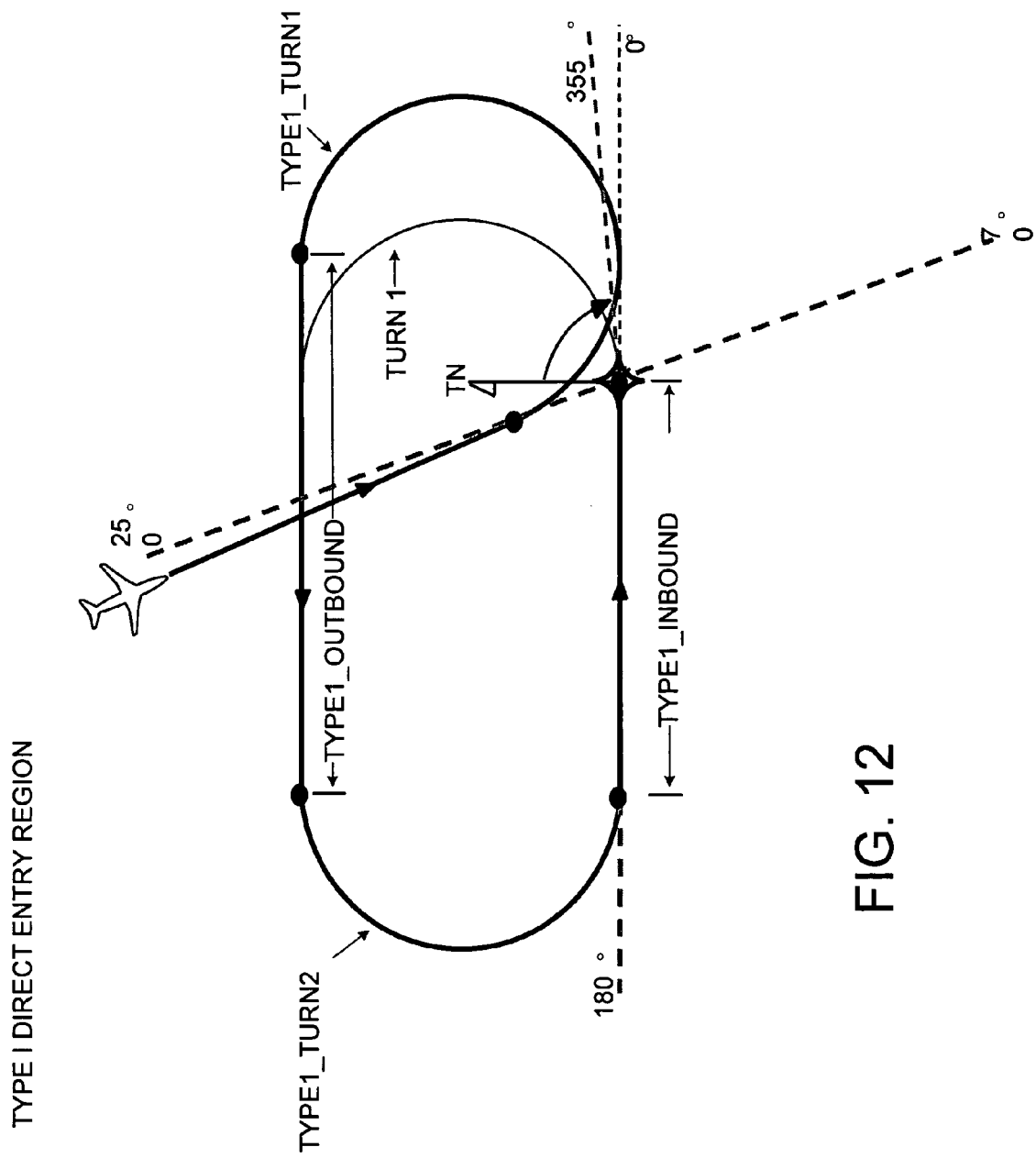
FIG. 12 is a schematic diagram of a exemplary type 1 direct holding pattern entry geometry.

Turning now to FIG. 12, an exemplary Type 1 holding entry geometry and some associated parameters are illustrated. The Type 1 holding pattern entry geometry includes four segments, TYPE1_TURN1, TYPE1_OUTBOUND, TYPE1_TURN2, and TYPE1_INBOUND. Again, each segment is defined as a curved or straight segment between endpoints.

Turning now to FIG. 13, a sequencing method 1300 for type 1 entry pattern is illustrated. In method 1300, the aircraft again begins at a PREVIOUS LEG. The PREVIOUS LEG will be defined by the current aircraft location within the boundaries of the parallel entry region.

Starting at the PREVIOUS LEG, the FMS will sequence control to either TYPE1_TURN1, TYPE1_OUTBOUND, TYPE1_TURN2, TYPE1_INBOUND, or INBOUND depending on which condition C1–C6 is met. For example, if condition C1 or C2 is met, the sequencing method controls to TYPE1_TURN1. Conversely, if condition C3 is met, the sequencing method controls to TYPE1_OUTBOUND. If condition C4 is met, the sequencing method controls to TYPE1_TURN2. If condition C5 is met, the sequencing method controls to TYPE1_INBOUND. Finally, if condition C6 is met, the sequencing method controls to INBOUND.

From there, the FMS will continue to sequence to new segments when the appropriate conditions are met. This sequencing method is designed to guide the aircraft from the tear drop region and on to the holding pattern. When the entry is completed, the sequence is passed to INBOUND and the FMS sequences through the holding pattern as described with reference to method 500.

Again, in general the conditions used to implement method 1300 are selected to have control sequence automatically to the next segment when under control of the FMS. Additionally, control sequences to the next segment when the aircraft crosses a wayline and is within a prescribed distance of the previous segment. Finally, control also sequences if the aircraft exceeds the prescribed distance, but is within another distance and is ontrack to the next segment. For the HA and HM Type I Hold Entry, when none of the segments are acceptable for capture (the track of the aircraft does not intercept the segments) then the hold INBOUND leg becomes the active segment and the original entry is removed. For the HF Type I Hold Entry the TYPE1_TURN2 becomes the active segment until sequencing into the CF leg when none of the segments are acceptable for capture.

Examples of conditions that may be used to implement method 1300 are listed in Appendix 4. Conditions C5, C6, C10, C11, C14, C15, C16, C17, and C18 are true for the HA and HM hold entry but not the HF leg hold entry. The Procedure Hold is constructed as two consecutive legs, the HF leg and CF leg (Inbound leg). The HF ends at the conditional waypoint INBD where the TYPE1_TURN2 intercept the CF leg.

Figure 14:
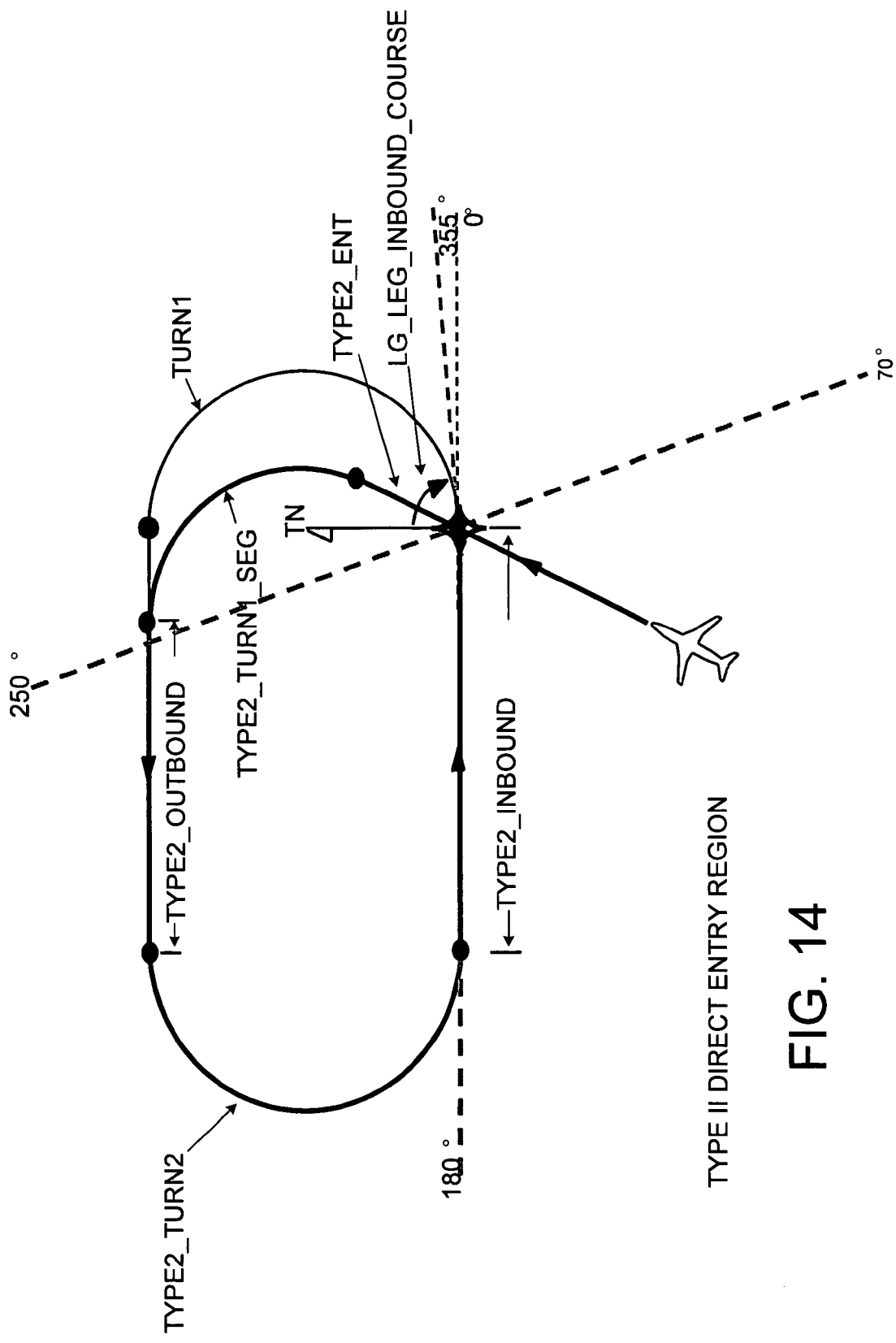
FIG. 14 is a schematic diagram of a exemplary type 2 direct holding pattern entry geometry.

Turning now to FIG. 14, an exemplary type II direct holding entry geometry and some associated parameters are illustrated. The type II direct holding pattern entry geometry includes five segments, TYPE2_ENT, TYPE2_TURN1, TYPE2_OUTBOUND, TYPE2_TURN2, and TYPE2_INBOUND. Again, each segment is defined as a curved or straight segment between endpoints.

Turning now to FIG. 15, a sequencing method 1500 for type II entry pattern is illustrated. In method 1500, the aircraft again begins at a PREVIOUS LEG. The PREVIOUS LEG will be defined by the current aircraft location within the boundaries of the parallel entry region.

Starting at the PREVIOUS LEG, the FMS will sequence control to either TYPE2_ENT, TYPE2_TURN1, TYPE2_OUTBOUND, TYPE2_TURN2, TYPE2_INBOUND or INBOUND depending on which condition C1–C7 is met. For example, if condition C1 or C2 is met, the sequencing method controls to TYPE2_ENT. Conversely, if condition C3 is met, the sequencing method controls to TYPE2_TURN1. If condition C4 is met, the sequencing method controls to TYPE2_OUTBOUND. If condition C5 is met, the sequencing method controls to TYPE5_TURN2. If condition C6 is met, the sequencing method controls to TYPE2_INBOUND. Finally, if condition C6 is met, the sequencing method controls to INBOUND.

From there, the FMS will continue to sequence to new segments when the appropriate conditions are met. This sequencing method is designed to guide the aircraft from the tear drop region and on to the holding pattern. When the entry is completed, the sequence is passed to INBOUND and the FMS sequences through the holding pattern as described with reference to method 500.

Again, in general the conditions used to implement method 1500 are selected to have control sequence automatically to the next segment when under control of the FMS. Additionally, control sequences to the next segment when the aircraft crosses a wayline and is within a prescribed distance of the previous segment. Finally, control also sequences if the aircraft exceeds the prescribed distance, but is within another distance and is ontrack to the next segment. For the HA and HM Direct Type II Hold Entry, when none of the segments are acceptable for capture (the track of the aircraft does not intercept the segments) then the hold INBOUND leg becomes the active segment and the original entry is removed. For the HF hold entry the TYPE2_TURN2_SEG becomes the active segment until sequencing into the CF leg when none of the segments are acceptable for capture.

Examples of conditions that may be used to implement method 1500 are listed in Appendix 5. Conditions C6, C7, C12, C13, C17, C18, C21, C22, C24, and C25 are true for the HA and HM hold entry but not the HF leg hold entry. The Procedure Hold is constructed as two consecutive legs, the HF leg and CF leg (Inbound leg). The HF ends at the conditional waypoint INBD where the bisector of TYPE2_TURN2_SEG intercept the CF leg (inbound).

The present invention thus provides a flight management system and method that determines segment sequencing during entry into holding patterns and the holding patterns themselves. This system and method operates by monitoring the aircraft's progress along the active segment of the flight plan to determine the appropriate next segment. When the aircraft approaches a holding pattern the flight management system determines the inbound delta, the difference between the hold orientation and the previous leg course. From the inbound delta, the flight management system determines the hold entry type for the entry into the holding pattern. For each hold entry type, the flight management system includes a holding pattern entry algorithm that defines a series of entry segments for that entry type and the control and capture criterion used to evaluate and select those entry segments. With the holding entry type determined, the flight management system evaluates each segment in the associated holding pattern entry algorithm to determine if that segment meets the control and capture criteria.

Figure 16:
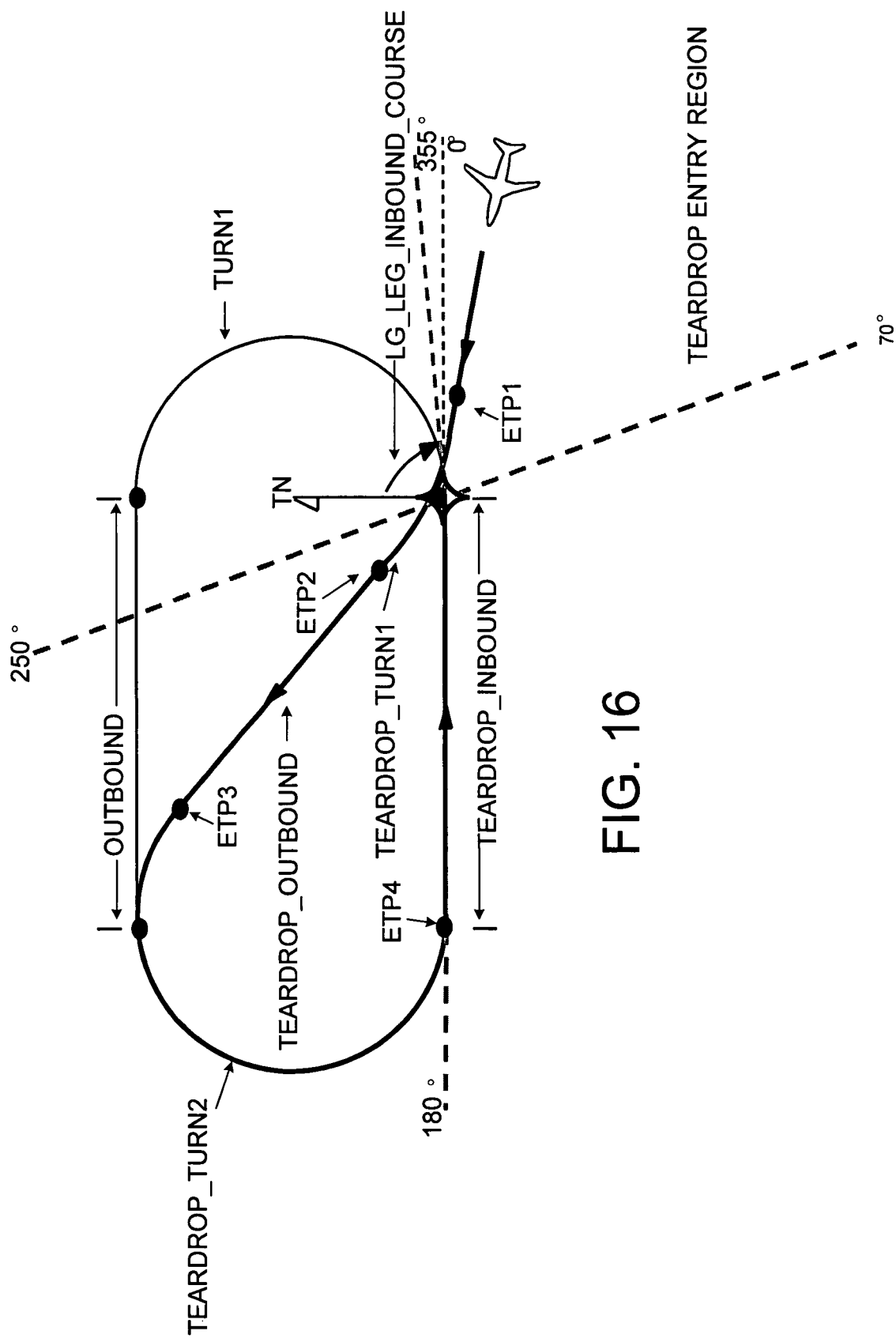
FIG. 16 is a detailed diagram of an exemplary teardrop holding pattern entry.

New guidelines allow the holding pattern entry types to allow cutting the corner at the initial waypoint sequence and at the exit of the hold. Previous entry definitions always assumed that the aircraft must fly wings level of the fix before turning. The new entry types also attempt to minimize the airspace used during the entry, while previous entry definitions attempted to minimize s-turns. The geometry of the holding pattern entry algorithms is a function several factors, including aircraft course, hold orientation, wind direction, wind magnitude, aircraft speed, altitude and hold leg length. Each hold entry type preferably has a unique geometry that uses unique algorithms A more detailed discussion of the preferred geometries associated with each holding pattern entry algorithm will now be provided. These geometries describe the specific location and distance of the various segments used in the holding pattern and holding pattern racetrack. Turning now to FIG. 16, the exemplary teardrop holding entry geometry and some associated parameters are illustrated. The teardrop holding pattern entry geometry includes five segments, TEARDROP_TURN1, TEARDROP_OUTBOUND, TEARDROP_TURN2, and TEARDROP_INBOUND. Each segment is defined as a curved or straight segment between endpoints. These endpoints include ENTRY TURN POINT 1 (ETP1), ENTRY TURN POINT 2 (ETP2), ENTRY TURN POINT 3 (ETP3) and ENTRY TURN POINT 4 (ETP4).

The teardrop holding entry geometry preferably includes a lateral leg transition type for the holding pattern entry and equations defining turn points and turn centers used to define the entry. The geometry also preferably includes criteria used to determine entry extension, maximum initial turn angle, and minimum distance between a hold fix and an entry turn point. The geometry also preferably extends entry distance to avoid excessive iterative calculations.

In the preferred entry geometry, leg transitions define the aircraft's path between lateral legs. The lateral transition type depends on the active and succeeding leg types. The five lateral leg transitions in the preferred geometry are Curved Path, Next Course Capture, Next Heading Capture, Non-standard Curved Path, and Holding Pattern Entry. Because new regulations allow fly-by transitions, holding pattern entries can now being treated as a unique transition type.

As described above, when a holding pattern is the next leg or the hold has just become the active leg, the FMS determines the hold entry type that it will fly to establish the aircraft on the holding pattern. When a holding pattern is the next leg or a holding pattern has just become the active leg, the FMS determines INBOUND DELTA as the difference between the previous leg course and the holding pattern oval inbound course. The FMS will use INBOUND DELTA to determine holding pattern entry type. When the next leg is a holding pattern and regardless of the defined entry type, the FMS constructs the entry path to make the most efficient use of the protected airspace. When the next leg is HA, HF, or HM, the FMS will set holding pattern entry type to TEARDROP if 0.0<=INBOUND DELTA<70.0 or 355.0<=INBOUND DELTA<360.0.

FIG. 16 illustrates the teardrop entry geometry and parameters associated with it. The teardrop entry starts at ETP1. HM (manually terminated holding patterns) and HA (altitude terminated holding patterns) legs include a non-standard curved path transition segment TEARDROP_TURN1 that is defined as the curve between ETP1 and ETP2, a straight segment TEARDROP_OUTBOUND between ETP2 and ETP3, a curved segment TEARDROP_TURN2 between ETP3 and ETP4, and a straight segment TEARDROP_INBOUND from ETP4 to the hold fix.

Procedure holds consist of an HF-CF leg combination. The teardrop entry HF leg includes a non-standard curved path transition TEARDROP_TURN1 between ETP1 and ETP2, a straight segment TEARDROP_OUTBOUND between ETP2 and ETP3, and a curved segment TEARDROP_TURN2 between ETP3 and the procedure hold INBD intercept point. The CF leg begins at the INBD intercept point and terminates at the hold fix.

For HM, HA, and HF legs, the first curved segment is a non-standard curved path transition from the prior leg to the first straight segment of the teardrop hold entry. It should be noted that this first curved segment has a turn radius based on course change which can be different than the hold turn radius.

The teardrop entry is not required to always as long as the hold racetrack. For HA and HM legs, the teardrop entry outbound length can initially set to be equal to the smaller of either (1) the hold racetrack outbound or (2) the default leg length for the aircraft altitude when the hold becomes active. If this initial entry size causes the TEARDROP_OUTBOUND to be shorter than a minimum distance, the teardrop entry is extended. The teardrop entry outbound length is modified to be equal to the greater of either (1) the hold racetrack outbound or (2) the default hold leg length for the aircraft altitude. For HF legs, the entry outbound length is always set equal to the holding pattern racetrack size.

It should be noted that because the TEARDROP_TURN1 is a transition from the prior leg to the TEARDROP_OUTBOUND, the requirements for ETP1 and ETP2 can in general not be calculated until ETP3 is known.

A detailed description of an algorithm for determining these segments will now be described. In general, the smallest entry is first defined. Then, an appropriate extension is determined. Finally, the original entry is revised to reflect any extension. The requirements are presented in this fashion for simplification. In reality, the function would only need to calculate a subset of entry characteristics before determining if an extension is appropriate and then calculate the entire entry.

When the active leg is HA, HM, or HF and the holding pattern entry type is TEARDROP, the FMS will set radius of TEARDROP_TURN2 equal to the radius of the holding pattern racetrack.

When the active leg is HA or HM and the holding pattern entry type is TEARDROP, the FMS will set the entry outbound distance to the minimum of the holding pattern racetrack outbound distance or a default leg length. The default leg length is set as:

$$LegLength = F\frac{(SH+SW)}{60} \quad \text{Equation 1}$$

Where F is the 1.5 minute flag, and is equal to 1.5 minutes if the altitude is above 14,000 feet and 1.0 minutes if the altitude is below 14,000 feet, SH is the predicted hold speed in nautical miles per hour and SW is the inbound wind speed in the direction of the holding pattern inbound course.

When the active leg is HF and the holding pattern entry type is TEARDROP, the FMS will set the entry outbound distance equal to the Holding Pattern Racetrack Outbound Distance.

When the active leg is HA, HM, or HF and the holding pattern entry type is TEARDROP, the FMS will locate ENTRY TURN POINT 3 a distance D and at a bearing B from THE HOLD FIX. Where D is equal to the ENTRY OUTBOUND DISTANCE, and where B is defined as:

$$B=IC+MAGVAR+RL(180-A) \quad \text{Equation 2}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = 2*\arctan\left(\frac{ETR2}{EOD}\right) \quad \text{Equation 3}$$

Where ETR2 is the entry turn radius 2 and EOD is the entry outbound distance.

When the active leg is HA, HM, or HF and the holding pattern entry type is TEARDROP, the FMS will locate ENTRY TURN POINT 4 a distance D and at a bearing B from THE HOLD FIX. Where D is equal to the ENTRY OUTBOUND DISTANCE, and where B is defined as:

$$B=IC+MAGVAR+180 \quad \text{Equation 4}$$

Where IC is the holding pattern inbound course, where MAGVAR is the magnetic variation between true north and magnetic north.

When the active leg is HA, HM, or HF and the holding pattern entry type is TEARDROP, the FMS will locate ENTRY TURN CENTER 2 a distance D and at a bearing B from THE HOLD FIX. Where B is defined by equations 2 and 3 and where D is defined as:

$$D=\sqrt{[(ETR2)^2+(EOD)^2]} \quad \text{Equation 5}$$

Where ETR2 is the entry turn radius 2 and EOD is the entry outbound distance.

When the active leg is HA, HM, or HF and the holding pattern entry type is TEARDROP, the FMS will set ENTRY TURN RADIUS 1 equal to TRANSITION TURN RADIUS for a non-standard curved path transition. This is a non-standard curved path transition from the prior leg to the TEARDROP OUTBOUND SEGMENT. This non-standard curved path transition should be calculated using predicted hold speed as the velocity.

When the active leg is HA, HM, or HF and the holding pattern entry type is TEARDROP, the FMS will set ENTRY TANGENT DISTANCE TO FIX equal to TRANSITION TANGENT POINT DISTANCE TO THE FIX for a non-standard curved path transition. This is a non-standard curved path transition from the prior leg to the TEARDROP OUTBOUND SEGMENT. This non-standard curved path transition should be calculated using predicted hold speed as the velocity.

When the active leg is HA, HM, or HF and the holding pattern entry type is TEARDROP, the FMS will set ENTRY TURN CENTER 1 equal to TRANSITION TURN CENTER for a non-standard curved path transition. This is a non-standard curved path transition from the prior leg to the TEARDROP OUTBOUND SEGMENT. This non-standard curved path transition should be calculated using predicted hold speed as the velocity.

When the active leg is HA, HM, or HF and the holding pattern entry type is TEARDROP, the FMS will locate ENTRY TURN POINT 1 a distance D and at a bearing B from THE HOLD FIX. Where D is entry tangent distance to fix and B is defined as $$B=IT+MAGVAR+180 \quad \text{Equation 6}$$

Where IT is the desired inbound track and where MAGVAR is the magnetic variation between true north and magnetic north, where the desired inbound track IT is the planned track from the prior leg into the hold fix from the flight plan if available, or the current true track if no planned track from the prior leg into the hold fix from the flight plan is available.

When the active leg is HA, HM, or HF and the holding pattern entry type is TEARDROP, the FMS will locate ENTRY TURN POINT 2 a distance D and at a bearing B from THE HOLD FIX, where D equals the entry tangent distance to FIX and B is defined by equations 2 and 3. This results in a bearing for TURN POINT 2 is by definition equal to the bearing for TURN POINT 3.

When the active leg is HA, HM, or HF and the holding pattern entry type is TEARDROP, the FMS will compute ENTRY TEARDROP OUTBOUND DISTANCE as the distance between ENTRY TURN POINT 2 and ENTRY TURN POINT 3. Specifically, the ENTRY TEARDROP OUTBOUND DISTANCE is equal to the ENTRY OUTBOUND DISTANCE minus the ENTRY TANGENT DISTANCE TO FIX When the active leg is HA, HM, or HF and the holding pattern entry type is TEARDROP, the FMS will compute the ENTRY DISTANCE LIMIT as the maximum of the holding pattern racetrack outbound distance or the default leg length, where the default leg length is defined by equation 1. For teardrop entries, the entry distance limit is generally only calculated when the hold is the next leg and when the hold first becomes active. It is not continuously re-evaluated while flying the holding pattern entry.

When the active leg is HA or HM and the holding pattern entry type is TEARDROP, the FMS will compute the ENTRY EXTENSION DISTANCE as follows: First if the ENTRY TEARDROP OUTBOUND DISTANCE is greater than the MINIMUM SEGMENT DISTANCE, and the arctangent of (ENTRY TURN RADIUS 2/ENTRY OUTBOUND DISTANCE) is less than 45 degrees, and Distance from fix to ENTRY TURN POINT 3 is greater than ENTRY TANGENT DISTANCE TO FIX, then the ENTRY EXTENSION DISTANCE is set equal to zero. If any of these conditions are not met, the ENTRY EXTENSION DISTANCE is set equal to the ENTRY DISTANCE LIMIT minus ENTRY OUTBOUND DISTANCE. And where the minimum segment distance MSD is defined as:

$$MSD = 2*[HS+OW]*RA*RC \quad \text{Equation 7}$$

Where HS is the predicted hold speed, OW is the teardrop outbound wind, RA is the roll angle, and RC is Roll C. OW is defined as the magnitude of the wind in the direction of B, where B is defined by equations 2 and 3. RA is defined as a 25 degree nominal bank angle with any roll limits applied. RC is defined as $$RC = 1/[3600 \text{ sec/hour} * 3 \text{ deg/sec}] \quad \text{Equation 8}$$

The teardrop entry needs to be extended when any of the following conditions are identified: the straight segment (ENTRY TEARDROP OUTBOUND DISTANCE) is less than the required roll anticipation distance, or the angle to the initial turn point is greater than 90 degrees from the inbound, or the non-standard curved path transition segment does not fit within the distance between the fix and ENTRY TURN POINT 3.

The teardrop entry is always extended to the limit to avoid an iterative calculation. This is required because the process of extending the teardrop entry also affects the non-standard curved path transition segment of the new entry.

When the active leg is HF and the holding pattern entry type is TEARDROP, the FMS will not allows any entry extension.

When the active leg is HA or HM and the holding pattern entry type is TEARDROP and ENTRY EXTENSION DISTANCE>0, the FMS will re-compute ENTRY OUTBOUND DISTANCE using the following equation:

ENTRY OUTBOUND DISTANCE=ENTRY OUTBOUND DISTANCE+ENTRY EXTENSION DISTANCE.

If the ENTRY EXTENSION DISTANCE is greater than 0, the entry is recalculated as described above using the new ENTRY OUTBOUND DISTANCE to reflect the extension. ENTRY TURN POINT 1, ENTRY TURN POINT 2, ENTRY TURN POINT 3, ENTRY TURN POINT 4, ENTRY TURN CENTER 1, ENTRY TURN CENTER 2, and ENTRY TEARDROP OUTBOUND DISTANCE must be recalculated.

Figure 17:
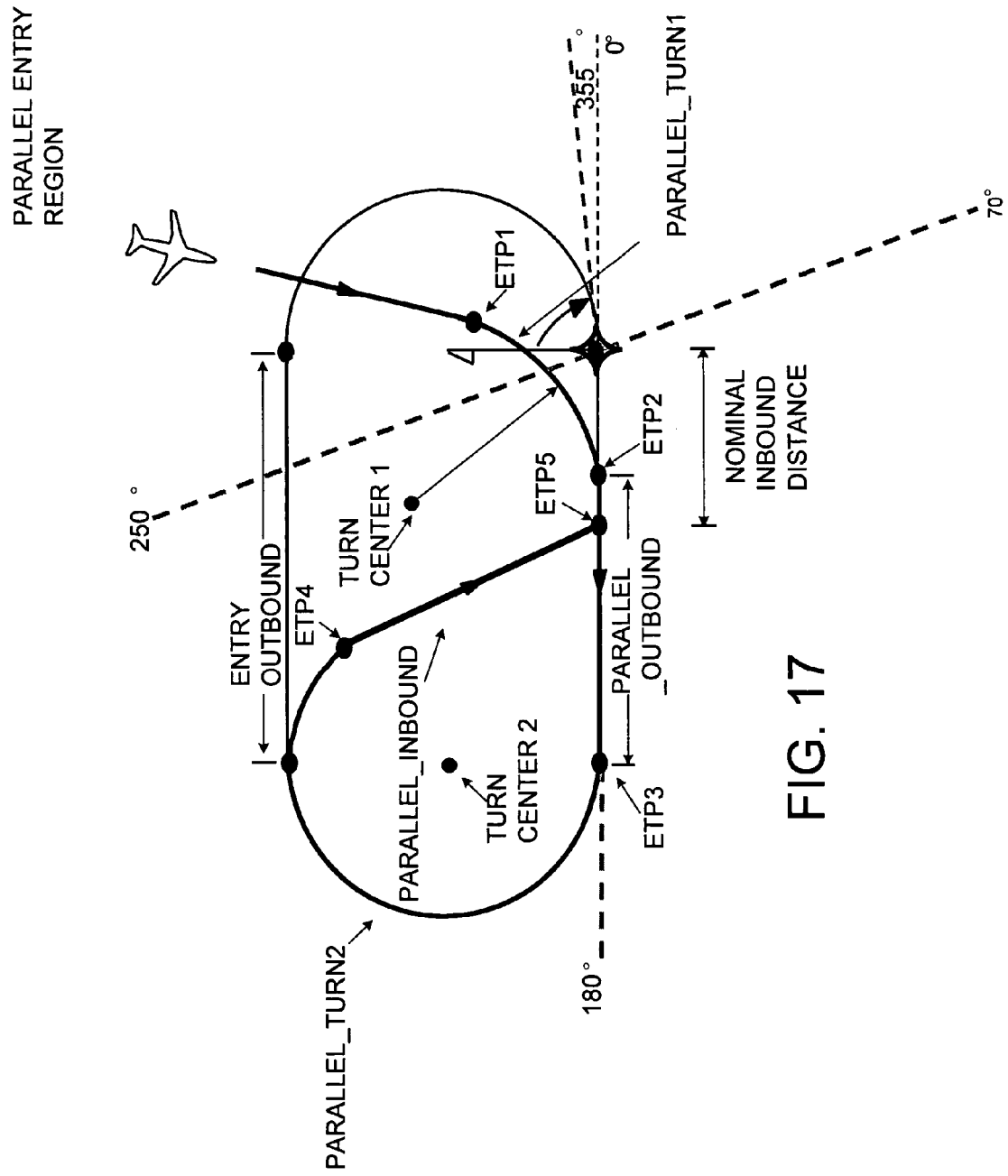
FIG. 17 is a detailed diagram of an exemplary parallel HF holding pattern entry.

Turning now to FIG. 17, the exemplary HF parallel entry geometry and some associated parameters are illustrated. The HF parallel holding pattern entry geometry includes four segments, PARALLEL_TURN1, PARALLEL_OUTBOUND, PARALLEL_TURN2 and PARALLEL_INBOUND. Again, each segment is defined as a curved or straight segment between endpoints. These endpoints include ENTRY TURN POINT 1 (ETP1), ENTRY TURN POINT 2 (ETP2), ENTRY TURN POINT 3 (ETP3), ENTRY TURN POINT 4 (ETP4) and ENTRY TURN POINT 5 (ETP5). In the procedure hold, a fifth course to a fix (CF) segment is added between the entry turn point 5 (ETP5) and the hold fix.

The HF parallel entry geometry preferably includes lateral leg transition type for the holding pattern entry and equations defining turn points and turn centers used to define the entry. The geometry also preferably includes criteria for minimum, maximum and nominal HF entry inbound distances.

In the preferred entry geometry, leg transitions define the aircraft's path between lateral legs. The lateral transition type depends on the active and succeeding leg types. The five lateral leg transitions in the preferred geometry are Curved Path, Next Course Capture, Next Heading Capture, Non-standard Curved Path, and Holding Pattern Entry. Because new regulations allow fly-by transitions, holding pattern entries can now being treated as a unique transition type.

As described above, when a holding pattern is the next leg or the hold has just become the active leg, the FMS determines the hold entry type that it will fly to establish the aircraft on the holding pattern. When a holding pattern is the next leg or a holding pattern has just become the active leg, the FMS determines INBOUND DELTA as the difference between the previous leg course and the holding pattern oval inbound course. The FMS will use INBOUND DELTA to determine holding pattern entry type. When the next leg is a holding pattern and regardless of the defined entry type, the FMS constructs the entry path to make the most efficient use of the protected airspace. When the next leg is a holding pattern, the FMS will set the entry type of parallel if the INBOUND DELTA is greater than or equal to 250 and less than 355 degrees.

FIG. 17 illustrates the HF parallel entry geometry and parameters associated with it. The HF parallel entry starts at ETP1. Procedure holds comprise an HF-CF leg combination, with the first four segments comprises HF segments, and the last segment comprising a CF segment. The HF parallel entry leg include a non-standard curved path transition segment PARALLEL_TURN1 that is defined as the curve between ETP1 and ETP2, a straight segment PARALLEL_OUTBOUND between ETP2 and ETP3, a curved segment PARALLEL_TURN2 between ETP3 and ETP4, and a straight segment PARALLEL_INBOUND from ETP4 to hold inbound intercept point (EPT5). The CF leg, also called the inbound segment, begins at the inbound intercept point (EPT5) and terminates at the hold fix.

The first curved segment (PARALLEL_TURN1) is a non-standard curved path transition from the prior leg to the first straight segment of the parallel hold entry. It should be noted that this first curved segment has a turn radius based on course change which can be different than the hold turn radius.

In HF parallel entry is preferably always as long as the hold racetrack, with no shortening of the HF entry allowed. When the active leg is an HF and the entry type is parallel, the FMS will set the entry turn radius equal to the hold racetrack turn radius, and the entry outbound distance will be set equal to the racetrack outbound segment distance.

In general, to calculate the inbound intercept (EPT5), the maximum and minimum lengths of the inbound segment are calculated. The nominal inbound segment distance is calculated based upon the altitude constraints on the HF and CF legs, with the length limited by the maximum and minimum leg lengths. The maximum length of inbound segment can be calculated for the circumstance when the PARALLEL_TURN2 segment is a 270 degree arc. The minimum length of the inbound segment can be calculated as the tangent distance of a 90 degree course change curved path transition.

Thus, when the active leg is HF and the holding pattern entry type is PARALLEL, the FMS will compute the HF entry inbound distance as THE ENTRY OUTBOUND DISTANCE minus the ENTRY TURN RADIUS 2. This maximum inbound distance corresponds to a geometry in which there is a 90 degree course change between HF and CF (inbound) legs.

Likewise, when the active leg is HF and the entry type is PARALLEL, the FMS will compute the minimum inbound distance as the maximum curved path transition tangent distance from the HF to the CF leg. This maximum transition distance is set equal to the holding pattern turn radius to approximate a 90 degree course change from the HF to the CF leg.

This method of calculation allows the determination of the minimum allowable inbound distance without requiring iterative calculation. The 90 degree course change in this requirement does not represent the actual HF-CF leg transition. Instead, it is only a conservative calculation used because the actual curved path transition will be dependent upon the final location of the entry turn point 3 (ETP3), which is itself dependent upon the minimum inbound distance. Using the holding pattern turn radius is thus a simplification to avoid requiring a calculation of the detailed curved path transition.

When the active leg is an HF, and the entry type is PARALLEL, and there are different altitude constraints on the inbound intercept and the hold fix, the FMS will compute the HF entry nominal inbound distance as the distance required to achieve a three degree vertical path between the two altitude constraints. Thus, the HF nominal inbound distance is defined as:

$$NomINBD = |CNSTR1 - CNSTR2| * 1NM/6076.155 \text{ ft/tan}(3°) \quad \text{Equation 9}$$

Where CNSTR1 is the altitude constraint on the HF leg, CNSTR2 is the altitude constraint on the inbound segment (CF leg).

When the active leg is an HF, and the entry type is parallel, and there are different altitude constraints on the inbound intercept (EPT5) and the hold fix, the FMS will limit the HF entry nominal inbound distance such it is between the maximum and minimum inbound distances. When there are not different altitude constraints between in the inbound intercept and the hold fix, the FMS will set the nominal inbound distance to the minimum entry inbound distance. If a longer CF leg is preferred, the FMS could set the nominal inbound distance to the average of the minimum inbound distance and the maximum inbound distance.

The FMS will set the ENTRY TURN RADIUS 1 equal to the transition turn radius for a non standard curved path transition. The ENTRY TURN RADIUS 1 is the radius of the PARELLEL_TURN1 segment. This is a non-standard curved path transition from the prior leg to the parallel outbound segment. This non-standard curved path transition should be calculated using the predicted holding pattern speed as the velocity.

The FMS will set the ENTRY TANGENT DISTANCE to fix equal to the transition tangent point distance to the fix for a non-standard curved path transition. The ENTRY TANGENT DISTANCE is the distance between EPT1 and the fix or EPT2 and the fix. This is a non-standard curved path transition from the prior leg to the parallel outbound segment. This non-standard curved path transition should also be calculated using the predicated holding pattern speed as the velocity.

The FMS will set the TURN CENTER 1 equal to the transition turn center for a non-standard curved path transition. This is a non-standard curved path transition from the prior leg to the parallel outbound segment. This non-standard curved path transition should also be calculated using predicted holding pattern speed as the velocity.

The FMS will locate the entry turn point 1 a distance D at a bearing B from the hold fix, where D is equal to the TANGENT DISTANCE TO FIX and where B is defined as:

$$B = IB + MAGVAR + 180 \quad \text{Equation 10}$$

Where MAGVAR is the magnetic variation between true north and magnetic north, and where IB is the desired inbound track. The desired inbound track is either the planned track from the prior leg into the hold fix from the flight plan if available or the current true track if no planned track from the leg to the hold fix from the flight plan is available.

The FMS will locate the ENTRY TURN POINT 2 a distance D at a bearing B from the hold fix, where D is the ENTRY TANGENT DISTANCE to fix and B is defined as:

$$B = IC + MAGVAR + 180 \quad \text{Equation 11}$$

Where MAGVAR is the magnetic variation between true north and magnetic north, and where IC is the holding pattern inbound course. This results in the bearing for ENTRY TURN POINT 2 equal to the bearing for ENTRY TURN POINT 3.

The FMS will compute the PARALLEL OUT DISTANCE as the distance between ENTRY TURN POINT 2 and ENTRY TURN POINT 3.

The FMS will locate ENTRY TURN POINT 3 a distance D and at a bearing B from the hold fix, where D is the ENTRY OUTBOUND DISTANCE and B is defined as:

$$B = IC + MAGVAR + 180 \quad \text{Equation 12}$$

The FMS will locate the ENTRY TURN POINT 4 a distance D and a bearing B from the hold fix, where D is defined as:

$$D = \sqrt{[\sin(A)*(EOD-NID)]^2 + [NID + \cos(A)*(EOD-NID)]^2} \quad \text{Equation 13}$$

where EOD is the ENTRY OUTBOUND DISTANCE, NID is the NOMINAL INBOUND DISTANCE, and where bearing B is defined as:

$$B = IC + MAGVAR + RL(180-A) \quad \text{Equation 14}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = 2 * \arctan\left(\frac{ETR2}{EOD - NID}\right) \quad \text{Equation 15}$$

Where ETR2 is the entry turn radius 2, EOD is the entry outbound distance, and NID is the nominal inbound distance.

The FMS will locate the ENTRY TURN CENTER 2 a distance D at a bearing B from the hold fix, where $$D = \sqrt{[ETR2]^2 + [EOD]^2} \quad \text{Equation 16}$$

Where ETR2 is the ENTRY TURN RADIUS 2 and where EOD is the ENTRY OUTBOUND DISTANCE, and where bearing B is defined as:

$$B = IC + MAGVAR + RL(180-A) \quad \text{Equation 17}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = 2 * \arctan\left(\frac{ETR2}{EOD}\right)$$ Equation 18

Where ETR2 is the entry turn radius 2 and EOD is the entry outbound distance.

The FMS will locate the ENTRY TURN POINT 5 a distance D at a bearing B from the hold fix, where D is the nominal inbound distance and B is defined as:

$$B = IC + MAGVAR + 180$$ Equation 19

Where IC is the holding pattern inbound course, where MAGVAR is the magnetic variation between true north and magnetic north.

The FMS will compute he entry parallel in distance as the distance between the ENTRY TURN POINT 4 and the procedure hold intercept point (EPT5)

Figure 18:
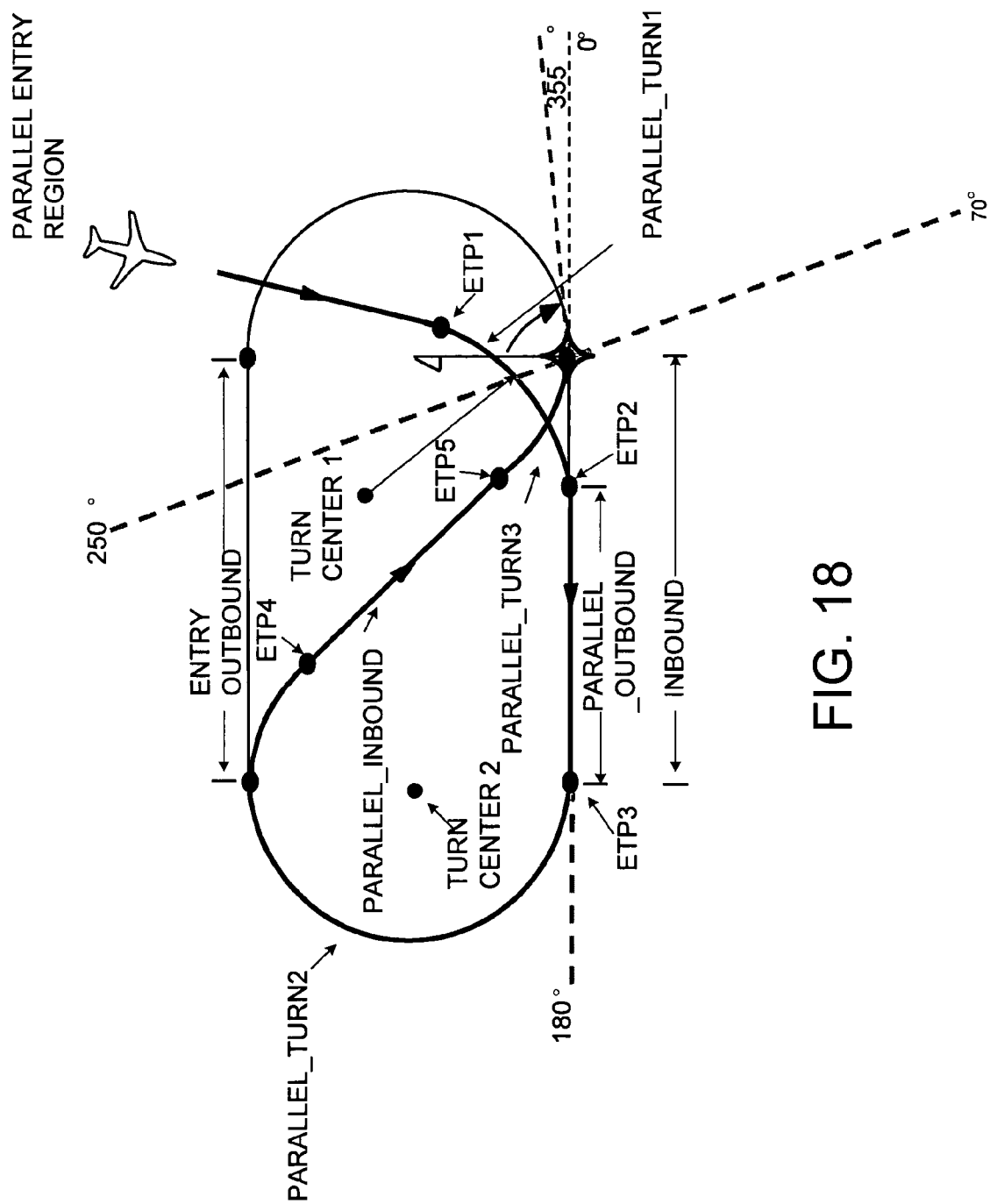
FIG. 18 is a detailed diagram of an exemplary parallel HA/HM holding pattern entry.

Turning now to FIG. 18, the exemplary HA and HM parallel entry geometry and some associated parameters are illustrated. The HA and HM parallel holding pattern entry geometry includes five segments, PARALLEL_TURN1, PARALLEL_OUTBOUND, PARALLEL_TURN2, PARALLEL_INBOUND and PARALLEL_TURN3. Again, each segment is defined as a curved or straight segment between endpoints. These endpoints include ENTRY TURN POINT 1 (ETP1), ENTRY TURN POINT 2 (ETP2), ENTRY TURN POINT 3 (ETP3), ENTRY TURN POINT 4 (ETP4) and ENTRY TURN POINT 5 (ETP5). PARALLEL_TURN3 is the curved segment between ENTRY TURN POINT 5 (ETP5) and the hold fix.

The HA/HM parallel entry geometry allows cutting the corner at the initial waypoint sequence and at the exit of the hold. The HA/HM parallel entry geometry attempts to minimize airspace used during the entry. The HA/HM parallel entry geometry preferably is a function of aircraft course, hold orientation, wind direction, wind magnitude, aircraft speed, altitude and hold leg length.

The HA/HM parallel entry geometry includes a unique lateral leg transition type for the entry holding pattern entry. The geometry includes equations for all turn points and turn centers to completely define HA/HM parallel entries. Also include are entry extension criteria for both the entry parallel in distance and the parallel out distance, and an entry extension distance algorithm.

In the preferred entry geometry, leg transitions define the aircraft's path between lateral legs. The lateral transition type depends on the active and succeeding leg types. The five lateral leg transitions in the preferred geometry are Curved Path, Next Course Capture, Next Heading Capture, Non-standard Curved Path, and Holding Pattern Entry. Because new regulations allow fly-by transitions, holding pattern entries can now being treated as a unique transition type.

As described above, when a holding pattern is the next leg or the hold has just become the active leg, the FMS determines the hold entry type that it will fly to establish the aircraft on the holding pattern. When a holding pattern is the next leg or a holding pattern has just become the active leg, the FMS determines INBOUND DELTA as the difference between the previous leg course and the holding pattern oval inbound course. The FMS will use INBOUND DELTA to determine holding pattern entry type. When the next leg is a holding pattern and regardless of the defined entry type, the FMS constructs the entry path to make the most efficient use of the protected airspace. When the next leg is a holding pattern, the FMS will set the entry type of parallel if the INBOUND DELTA is greater than or equal to 250 and less than 355 degrees.

FIG. 18 illustrates the HA and HM parallel entry geometry and parameters associated with it. The parallel entry starts at ETP1. The HA/HM parallel entry leg include a non-standard curved path transition segment PARALLEL_TURN1 that is defined as the curve between ETP1 and ETP2, a straight segment PARALLEL_OUTBOUND between ETP2 and ETP3, a curved segment PARALLEL_TURN2 between ETP3 and ETP4, a straight segment PARALLEL_INBOUND from ETP4 to EPT5, and a curved segment PARALLEL_TURN3 from EPT5 to the hold fix.

The first curved segment (PARALLEL_TURN1) is a non-standard curved path transition from the prior leg to the first straight segment of the parallel hold entry. It should be noted that this first curved segment has a turn radius based on course change which can be different than the hold turn radius.

In HA/HM parallel entry is not always as long as the hold racetrack. Thus, the parallel entry outbound length is initially set to be equal to the smaller of the hold racetrack outbound or the default leg length for the aircraft altitude when the hold becomes active. The initial parallel entry is extended if required to ensure that the non-standard curved path fits within the entry geometry and the parallel inbound segment is at least as long as the required roll anticipation distance. The extended parallel entry outbound distance is limited to be less than or equal to the greater to the greater of the hold racetrack outbound or the default hold leg length of for the aircraft altitude.

Thus, when the active leg is HA/HM and the holding pattern entry type is PARALLEL, the FMS will set the ENTRY TURN RADIUS 2 equal to the hold racetrack turn radius. The FMS will compute the ENTRY OUTBOUND DISTANCE to be the minimum of the holding pattern racetrack outbound distance or the default leg length, where the default leg length is set as:

$$LegLength = F\frac{(SH + SW)}{60}$$ Equation 20

Where F is the 1.5 minute flag, and is equal to 1.5 minutes if the altitude is above 14,000 feet and 1.0 minutes if the altitude is below 14,000 feet, SH is the predicted hold speed in nautical miles per hour and SW is the inbound wind speed in the direction of the holding pattern inbound course.

Likewise, when the active leg is HA/HM and the entry type is PARALLEL, the FMS will set the ENTRY TURN RADIUS 1 equal to the transition turn radius for a non-standard curved path transition. The ENTRY TURN RADIUS 1 is the radius of the PARALLEL_TURN1 segment. This is a non-standard curved path transition from the prior leg to the PARALLEL OUTBOUND SEGMENT. This non-standard curved path transition should be calculated using predicted hold speed as the velocity.

The FMS will set the ENTRY TANGENT DISTANCE to fix equal to the transition tangent point distance to the fix for a non-standard curved path transition. The ENTRY TANGENT DISTANCE is the distance between EPT1 and the fix or EPT2 and the fix. This is a non-standard curved path transition from the prior leg to the parallel outbound segment. This non-standard curved path transition should also be calculated using the predicated holding pattern speed as the velocity.

The FMS will set the TURN CENTER 1 equal to the transition turn center for a non-standard curved path transition. This is a non-standard curved path transition from the prior leg to the parallel outbound segment. This non-standard curved path transition should also be calculated using predicted holding pattern speed as the velocity.

The FMS will locate the ENTRY TURN POINT 1 a distance D at a bearing B from the hold fix, where D is equal to the TANGENT DISTANCE TO FIX and where B is defined as:

$$B = IB + MAGVAR + 180 \qquad \text{Equation 21}$$

Where MAGVAR is the magnetic variation between true north and magnetic north, and where IB is the desired inbound track. The desired inbound track is either the planned track from the prior leg into the hold fix from the flight plan if available or the current true track if no planned track from the leg to the hold fix from the flight plan is available.

The FMS will locate the ENTRY TURN POINT 2 a distance D at a bearing B from the hold fix, where D is the ENTRY TANGENT DISTANCE to fix and B is defined as:

$$B = IC + MAGVAR + 180 \qquad \text{Equation 22}$$

Where MAGVAR is the magnetic variation between true north and magnetic north, and where IC is the holding pattern inbound course. This results in the bearing for ENTRY TURN POINT 2 equal to the bearing for ENTRY TURN POINT 3.

The FMS will compute the PARALLEL OUT DISTANCE as the distance between ENTRY TURN POINT 2 and ENTRY TURN POINT 3.

The FMS will locate ENTRY TURN POINT 3 a distance D and at a bearing B from the hold fix, where D is the ENTRY OUTBOUND DISTANCE and B is defined as:

$$B = IC + MAGVAR + 180 \qquad \text{Equation 23}$$

The FMS will locate the ENTRY TURN POINT 4 a distance D and a bearing B from the hold fix, where bearing B is defined as:

$$B = IC + MAGVAR + RL(180 - A2) \qquad \text{Equation 24}$$

where angle A2 is defined as:

$$A2 = \arctan\left(\frac{ETR2 + (\sin(A1) * ETR2)}{EOD - (\cos(A1) * ETR2)}\right) \qquad \text{Equation 25}$$

and where distance D is defined as:

$$D = \sqrt{[ETR2 + (\sin(A1)*ETR2)]^2 + [EOD - (\cos(A1)*ETR2)]^2} \qquad \text{Equation 26}$$

where ETR2 is the ENTRY TURN RADIUS 2 and EOD is the ENTRY OUTBOUND DISTANCE, Where RL is +1 if the holding pattern turn direction is right, and −1 if the holding pattern turn direction is left, where IC is the holding pattern inbound course, where MAGVAR is the magnetic variation between true north an magnetic north, and where the angle A1 is defined as:

$$A1 = \arccos\left(\frac{2ETR2}{EOD}\right) \qquad \text{Equation 27}$$

The FMS will locate the ENTRY TURN CENTER 2 a distance D at a bearing B from the hold fix, where $$D = \sqrt{[ETR2]^2 + [EOD]^2} \qquad \text{Equation 28}$$

Where ETR2 is the ENTRY TURN RADIUS 2 and where EOD is the ENTRY OUTBOUND DISTANCE, and where bearing B is defined as:

$$B = IC + MAGVAR + RL(180 - A) \qquad \text{Equation 29}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = 2 * \arctan\left(\frac{ETR2}{EOD}\right) \qquad \text{Equation 30}$$

Where ETR2 is the entry turn radius 2 and EOD is the entry outbound distance.

The FMS will locate the ENTRY TURN POINT 5 a distance D at a bearing B from the hold fix, where D is defined as:

$$D = \sqrt{[ETR2 + (\sin(A1)*ETR2)]^2 + [EOD - (\cos(A1)*ETR2)]^2} \qquad \text{Equation 31}$$

And where the bearing B is defined as:

$$B = IC + MAGVAR + RL(180 - A2) \qquad \text{Equation 32}$$

Where RL is +1 if the holding pattern turn direction is right, and −1 if the holding pattern turn direction is left, where IC is the holding pattern inbound course, where MAGVAR is the magnetic variation between true north an magnetic north, and where A1 is defined as:

$$A1 = \arccos\left(\frac{2ETR2}{EOD}\right) \qquad \text{Equation 33}$$

And where A2 is defined as:

$$A2 = 45 - 0.5 * A1 \qquad \text{Equation 34}$$

The FMS will locate ENTRY TURN CENTER 3 a distance D at a bearing B from the hold fix, where the distance D is set equal to the ENTRY TURN RADIUS 2 and where the bearing B is defined as:

$$B = IC + MAGVAR + RL90 \qquad \text{Equation 35}$$

Where RL is +1 if the holding pattern turn direction is right, and −1 if the holding pattern turn direction is left, where IC is the holding pattern inbound course, where MAGVAR is the magnetic variation between true north an magnetic north.

The FMS will compute the ENTRY PARALLEL IN DISTANCE as the distance between the ENTRY TURN POINT 4 and ENTRY TURN POINT 5. The entry parallel in distance D is defined as:

and where distance D is defined as:

$$D = \sqrt{[ETR2 + (\sin(A1)*ETR2)]^2 + [EOD - (\cos(A1)*ETR2)]^2} \qquad \text{Equation 36}$$

$$\sqrt{[ETR2 + (\sin(A1) * ETR2)]^2 + [(\cos(A1) * ETR2)]^2}$$

where ETR2 is the ENTRY TURN RADIUS 2 and EOD is the ENTRY OUTBOUND DISTANCE, and where the angle A1 is defined as:

$$A1 = \arccos\left(\frac{2ETR2}{EOD}\right) \qquad \text{Equation 37}$$

As will become clear, the ENTRY PARALLEL IN DISTANCE is used in the determination of parallel extension.

The FMS will compute the ENTRY DISTANCE LIMIT as the maximum of the holding pattern racetrack outbound distance of the default leg length, where the default leg length is again defined as:

$$LegLength = F\frac{(SH + SW)}{60} \qquad \text{Equation 38}$$

Where F is the 1.5 minute flag, and is equal to 1.5 minutes if the altitude is above 14,000 feet and 1.0 minutes if the altitude is below 14,000 feet, SH is the predicted hold speed in nautical miles per hour and SW is the inbound wind speed in the direction of the holding pattern inbound course.

It should be noted that for parallel entries, the entry distance limit is only calculated when the hold is the next leg and when the hold first becomes active. Thus, the entry distance limit does not need to be constantly re-evaluated while flying holding pattern entry.

The FMS will compute the ENTRY EXTENSION DISTANCE as follows. If the ENTRY PARALLEL IN DISTANCE is greater than the MINIMUM SEGMENT DISTANCE, and the ENTRY PARALLEL OUT DISTANCE is greater than or equal to zero, then the ENTRY EXTENSION DISTANCE will be set equal to zero. Thus, no extension will be added.

However, if the ENTRY PARALLEL IN DISTANCE is less than the MINIMUM SEGMENT DISTANCE, or the ENTRY PARALLEL OUT DISTANCE is less than zero, then the ENTRY EXTENSION DISTANCE (EED) will be set equal to the maximum of:

$$EED = \frac{MSD}{\sin(A1) - EOD} \qquad \text{Equation 39}$$

and $$EED = ETD - EOD \qquad \text{Equation 40}$$

where EOD is the ENTRY OUTBOUND DISTANCE, ETD is the ENTRY TANGENT DISTANCE TO FIX, and where the angle A1 is defined as:

$$A1 = \arctan\left(\frac{MSD}{2ETR2}\right) \qquad \text{Equation 41}$$

where ETR2 is the ENTRY TURN RADIUS 2 and where MSD is the MINIMUM SEGMENT DISTANCE and is defined as: And where the minimum segment distance MSD is defined as:

$$MSD = 2*[HS + IW]*RA*RC \qquad \text{Equation 42}$$

Where HS is the predicted hold speed, IW is the predicted inbound wind in the direction of B, where B is defined as:

$$B = IC + MAGVAR + RL(90 - A) \qquad \text{Equation 43}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as the angle between the course and the hold orientation.

RA is the roll angle, and RC is Roll C. RA is defined as a 25 degree nominal bank angle with any roll limits applied. RC is defined as $$RC = 1/[3600 \text{ sec/hour} * 3 \text{ deg/sec}] \qquad \text{Equation 44}$$

In general, the parallel entry needs to be extended when either of the following conditions are identified, the non-standard curved path transition does not fit within the distance between the fix and ENTRY TURN POINT 3, or the straight segment ENTRY PARALLEL IN DISTANCE is less than the required roll anticipation distance. It should be noted that the parallel entry does not need to be extended to the limit to avoid an iterative calculation. Unlike the teardrop, the process of extending the parallel entry does not affect the non-standard curved path transition onto the entry.

Specifically, the FMS will limit the ENTRY EXTENSION DISTANCE to be less than or equal to the ENTRY DISTANCE LIMIT—ENTRY OUTBOUND DISTANCE. The FMS will re-compute the ENTRY OUTBOUND DISTANCE as the sum of the previous ENTRY OUTBOUND DISTANCE plus the ENTRY EXTENSION DISTANCE. If the ENTRY EXTENSION DISTANCE is greater than zero, the entry is recalculated as described above using the new ENTRY OUTBOUND DISTANCE to reflect the extension. Thus, ENTRY TURN POINT 3, ENTRY TURN POINT 4, ENTRY TURN CENTER 2, ENTRY TURN POINT 5, ENTRY PARALLEL OUT DISTANCE and ENTRY PARALLEL IN DISTANCE should be re-calculated.

Figure 19:
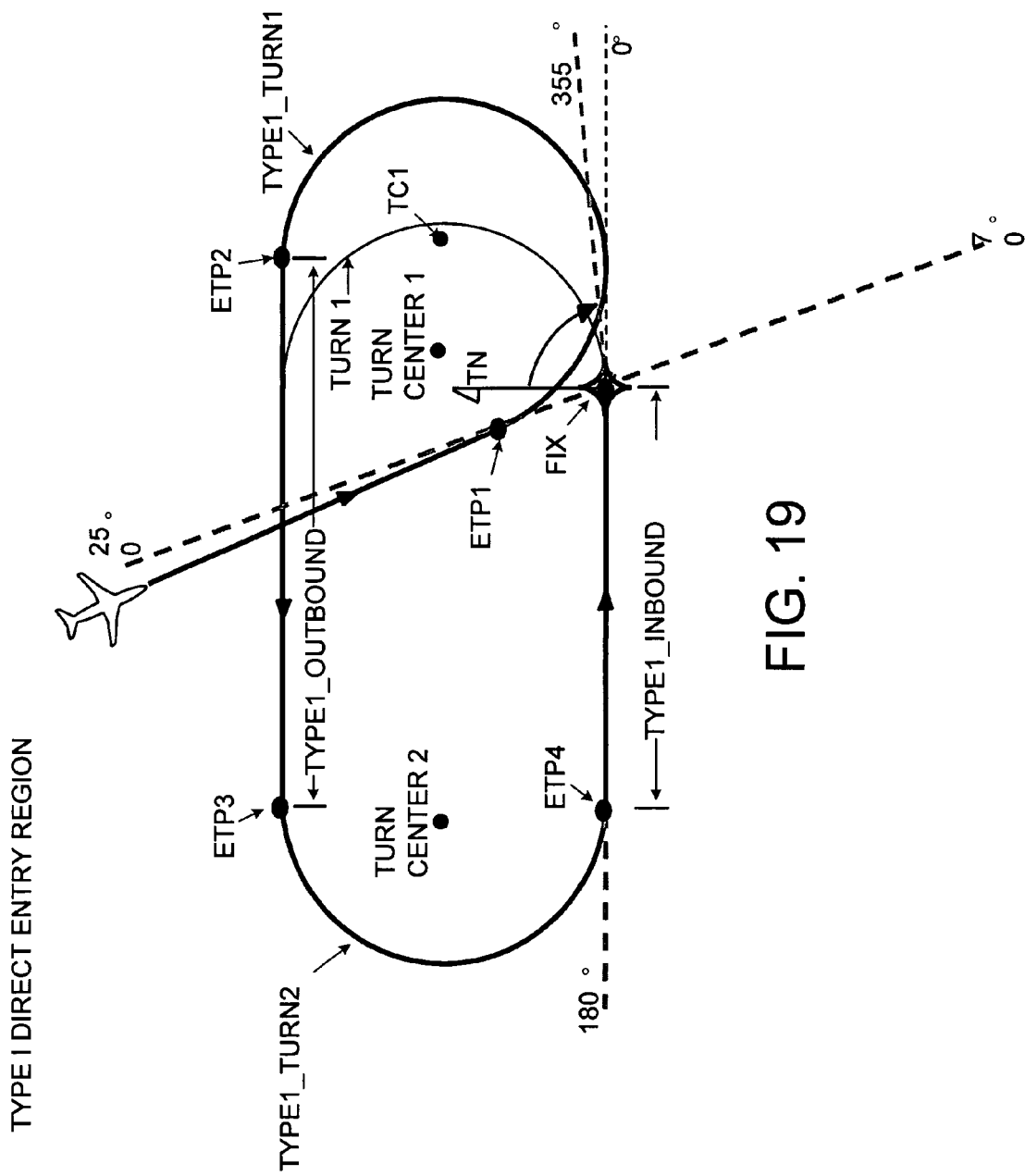
FIG. 19 is a detailed diagram of an exemplary type 1 direct holding pattern entry.

Turning now to FIG. 19, the exemplary TYPE 1 an exemplary Type 1 holding entry geometry and some associated parameters are illustrated. This entry geometry is for all three types, HF, HA, and HM. The Type 1 holding pattern entry geometry includes four segments, TYPE1_TURN1, TYPE1_OUTBOUND, TYPE1_TURN2, and TYPE1_INBOUND. Again, each segment is defined as a curved or straight segment between endpoints. These endpoints include ENTRY TURN POINT 1 (ETP1), ENTRY TURN POINT 2 (ETP2), ENTRY TURN POINT 3 (ETP3) and ENTRY TURN POINT 4 (ETP4). The TYPE1_INBOUND segment is the segment between ENTRY TURN POINT 5 (ETP5) and the hold fix.

The HF/HA/HM TYPE 1 holding entry geometry allows cutting the corner at the initial waypoint sequence and at the exit of the hold. The HF/HF/HM TYPE 1 holding entry geometry attempts to minimize airspace used during the entry. The TYPE 1 holding entry geometry preferably is a function of aircraft course, hold orientation, wind direction, wind magnitude, aircraft speed, altitude and hold leg length.

The TYPE 1 entry geometry includes a unique lateral leg transition type for the entry holding pattern entry. The geometry includes equations for all turn points and turn centers to completely define HF/HA/HM type 1 entries. Also included are entry extension criteria for TYPE 1 entry.

In the preferred entry geometry, leg transitions define the aircraft's path between lateral legs. The lateral transition type depends on the active and succeeding leg types. The five lateral leg transitions in the preferred geometry are Curved Path, Next Course Capture, Next Heading Capture, Non-standard Curved Path, and Holding Pattern Entry. Because new regulations allow fly-by transitions, holding pattern entries can now being treated as a unique transition type.

As described above, when a holding pattern is the next leg or the hold has just become the active leg, the FMS determines the hold entry type that it will fly to establish the aircraft on the holding pattern. When a holding pattern is the next leg or a holding pattern has just become the active leg, the FMS determines INBOUND DELTA as the difference between the previous leg course and the holding pattern oval inbound course. The FMS will use INBOUND DELTA to determine holding pattern entry type. When the next leg is a holding pattern and regardless of the defined entry type, the FMS constructs the entry path to make the most efficient use of the protected airspace. When the next leg is a holding pattern, the FMS will set the entry type of parallel if the INBOUND DELTA is greater than or equal to 180 and less than 250 degrees.

FIG. 19 illustrates the TYPE 1 entry geometry and parameters associated with it. The TYPE 1 entry starts at ETP1. The first segment, TYPE1_TURN1, starts at ETP1 until it reaches the first straight segment at ETP2. The first straight segment, TYPE1_OUTBOUND is defined as the segment between ETP2 and ETP3. The aircraft will fly the TYPE1_OUTBAND segment until it reaches the third segment. The third segment will depend upon the leg type.

Specifically, for HA and HM legs, the next segment is a TYPE1_TURN2 segment, between ETP3 and ETP4. Then the aircraft follows a straight segment TYPE1_INBOUND until it reaches the hold fix. When the aircraft reaches the hold fix, the aircraft is then on the holding pattern.

For HF legs, the next segment is also a TYPE1_TURN2 segment, between ETP3 and ETP4. However, at this point, the next segment TYPE1_INBOUND, is a CF leg. The aircraft will sequence until it sequences the holding pattern fix When flying a default leg time, the entry segments above can be re-sized if flying through 14,000 feet (climbing or descending), which causes the default leg time to change. The holding pattern and the entry segments will be re-sized if the aircraft is on the TYPE1_TURN1 segment or the TYPE1_OUTBOUND segment, and only if the entry magenta path is not taken away from the aircraft.

Thus, when the holding pattern is TYPE_1, the FMS will compute direct type 1 entry when any of the following cases are met.

The first case is if the active leg is HA, HM or HF and the aircraft has sequenced the hold fix for the first time (holding pattern fix). This is the typically normal case.

The second case is met if the active leg is HA or HM, and the active leg segment is TYPE1_TURN1, and the aircraft is flying a default holding time, and the aircraft flies through 14,000 feet. This is a case that allows for resizing of entry segment while flying through 14,000 feet.

The third case is met if the active leg is HA or HM, and the active leg segment is TYPE1_OUTBOUND, and the aircraft is flying a default holding time, and the aircraft flies through 14,000 feet, and the holding pattern racetrack outbound distance (the remaining distance on the active segment) is less than LG_1_MIN distance minus the roll anticipation distance. This is another case that allows for resizing of entry segment while flying through 14,000 feet.

It should also be noted that HF legs are not resized when flying through 14,000 feet and the active default hold time means the aircraft is flying a default hold time.

When the active leg is HA, HM or HF and the entry type is TYPE_1, the FMS will compute the DEFAULT OUTBOUND leg length as: defined as:

$$LegLength = F\frac{(SH + SW)}{60} \qquad \text{Equation 45}$$

Where F is the 1.5 minute flag, and is equal to 1.5 minutes if the altitude is above 14,000 feet and 1.0 minutes if the altitude is below 14,000 feet, SH is the predicted hold speed in nautical miles per hour and SW is the inbound wind speed in the direction of the holding pattern inbound course.

When the active leg is HA, HM or HF, the FMS will compute the TYPE 1 ENTRY EXTENSION distance (EED) as:

$$EED = \frac{HPR}{\left[\tan\frac{360 - ID}{2}\right]} \qquad \text{Equation 46}$$

Where HPR is the holding pattern radius, ID is the INBOUND DELTA. When the INBOUND DELTA is 180 degrees, the ENTRY EXTENSION DISTANCE is set to zero. This method of computing the ENTRY EXTENSION distance conforms to the allowable extension limit set in DO-236A.

When the active leg is HA, HM or HF, the FMS will compute the TYPE 1 ENTRY OUTBOUND distance (EOD) as equal to the holding pattern racetrack outbound distance plus the TYPE1 ENTRY EXTENSION distance.

When the active leg is HA, HM or HF, the FMS will compute the TYPE 1 ENTRY INBOUND distance (EID) as equal to the holding pattern racetrack outbound distance.

The FMS will locate the ENTRY TURN POINT 1 a distance D at a bearing B from the hold fix, where D is equal to the TYPE 1 EXTENSION distance and where B is defined as:

$$B = IB + MAGVAR + 180 \qquad \text{Equation 47}$$

Where MAGVAR is the magnetic variation between true north and magnetic north, and where IB is the desired inbound track. The desired inbound track is either the planned track from the prior leg into the hold fix from the flight plan if available or the current true track if no planned track from the leg to the hold fix from the flight plan is available.

The FMS will locate the ENTRY TURN CENTER 2 a distance D at a bearing B from the hold fix, where D is defined as:

$$D = \sqrt{[EED]^2 + [HPR]^2} \qquad \text{Equation 48}$$

Where EED is the ENTRY EXTENSION DISTANCE, and HPR is the HOLDING PATTERN RADIUS. And where bearing B is defined as:

$$B = IC + MAGVAR + RL\left(\arctan\left[\frac{HPR}{EED}\right]\right) \quad \text{Equation 49}$$

Where RL is +1 if the holding pattern turn direction is right, and −1 if the holding pattern turn direction is left.

The FMS will locate the ENTRY TURN POINT 2 a distance D and a bearing B from the hold fix, where D is defined as:

$$D = \sqrt{[EED]^2 + [2*HPR]^2} \quad \text{Equation 50}$$

Where EED is the ENTRY EXTENSION DISTANCE, and HPR is the HOLDING PATTERN RADIUS. And where bearing B is defined as:

$$B = IC + MAGVAR + RL\left(\arctan\left[\frac{2*HPR}{EED}\right]\right) \quad \text{Equation 51}$$

Where RL is +1 if the holding pattern turn direction is right, and −1 if the holding pattern turn direction is left.

The FMS will locate the ENTRY TURN POINT 3 a distance D and a bearing B from the hold fix, where D is defined as:

$$D = \sqrt{[ID]^2 + [2*HPR]^2} \quad \text{Equation 52}$$

Where ID is the HOLD RACETRACK INBOUND DISTANCE and HPR is the HOLDING PATTERN RADIUS. And where bearing B is defined as:

$$B = IC + MAGVAR + RL(180 - A) \quad \text{Equation 53}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = \arctan\left[\frac{2*HPR}{EID}\right] \quad \text{Equation 54}$$

Where HPR is the HOLDING PATTERN RADIUS and EID is the type 1 ENTRY INBOUND DISTANCE.

The FMS will locate the ENTRY TURN POINT 4 a distance D and a bearing B from the hold fix, where D is defined as the type 1 ENTRY INBOUND distance, and where B is defined as:

$$B = IC + MAGVAR + 180 \quad \text{Equation 55}$$

Where RL is +1 if the holding pattern turn direction is right, and −1 if the holding pattern turn direction is left, where IC is the holding pattern inbound course, where MAGVAR is the magnetic variation between true north an magnetic north.

The FMS will locate the ENTRY TURN CENTER 2 a distance D and a bearing B from the hold fix, where D is defined as:

$$D = \sqrt{[ID]^2 + [HPR]^2} \quad \text{Equation 56}$$

Where ID is the HOLD RACETRACK INBOUND DISTANCE and HPR is the HOLDING PATTERN RADIUS. And where bearing B is defined as:

$$B = IC + MAGVAR + RL(180 - A) \quad \text{Equation 57}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = \arctan\left(\frac{HPR}{ID}\right) \quad \text{Equation 58}$$

Where HPR is the HOLDING PATTERN RADIUS and ID is the HOLD RACETRACK INBOUND DISTANCE.

Figure 20:
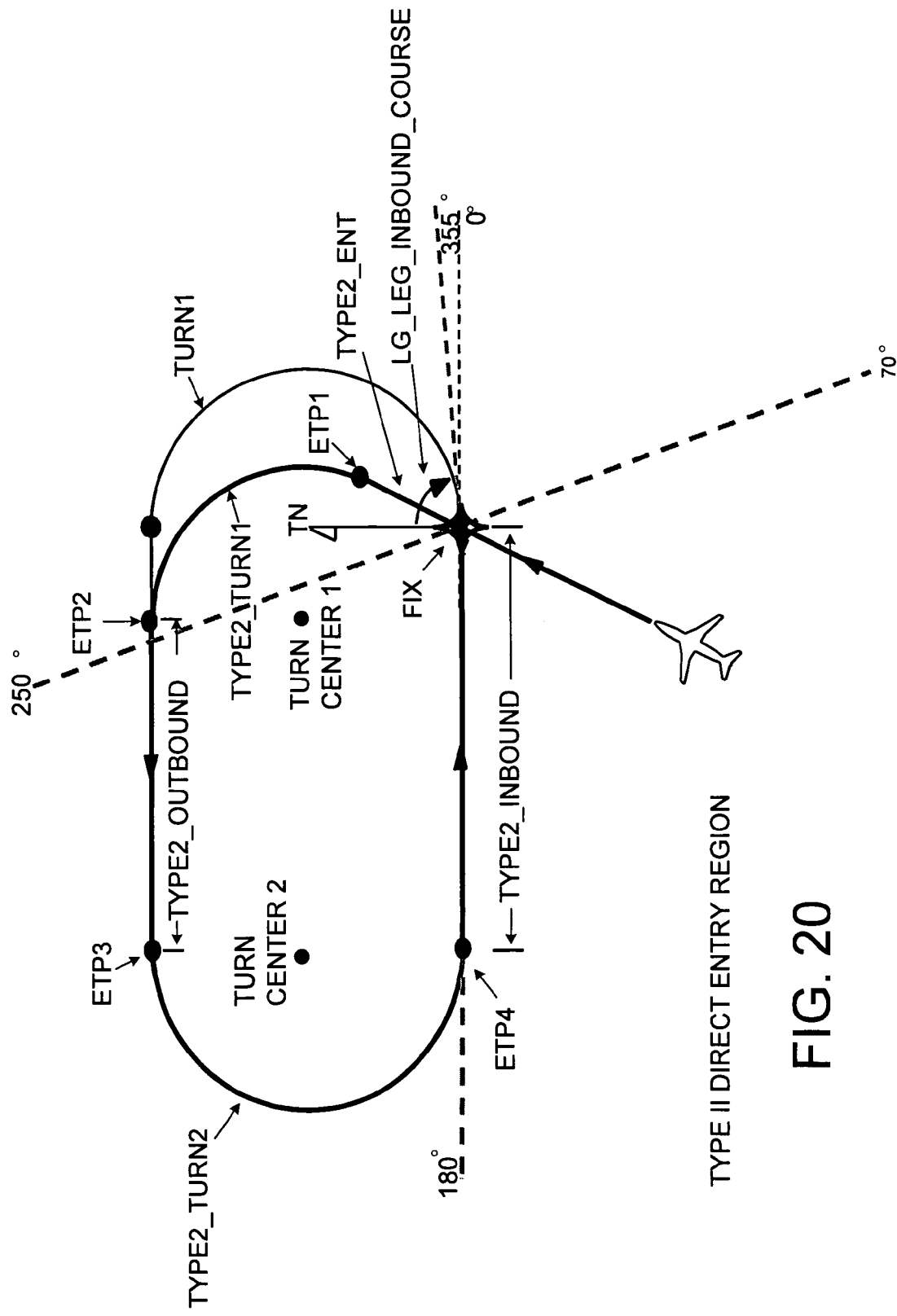
FIG. 20 is a detailed diagram of an exemplary type 2 direct holding pattern entry.

FIG. 20 illustrates the TYPE 2 entry geometry and parameters associated with it. The TYPE 2 direct holding pattern entry geometry includes five segments, TYPE2_ENT, TYPE2_TURN1, TYPE2_OUTBOUND, TYPE2_TURN2, and TYPE2_INBOUND. Again, each segment is defined as a curved or straight segment between endpoints. The first segment, the straight segment TYPE1_ENT, starts at the fix and ends at ETP1. The second segment, the curved segment TYPE2_TURN1 starts at ETP1 and ends at ETP2. The third segment, the straight segment TYPE2_OUTBOUND starts at ETP2 and ends at ETP3. The fourth segment, the curved segment TYPE2_TURN2, starts at ETP3 and ends at ETP4. The fourth segment, the straight segment TYPE2_INBOUND starts at ETP4 and ends at the fix.

The TYPE 2 entry geometry preferably includes lateral leg transition type for the holding pattern entry and equations defining turn points and turn centers used to define the entry. This includes geometry for all turn points and turn centers to completely defined HA, HM and HF direct TYPE 2 entries. Furthermore, the geometry preferably includes entry extension algorithms that obey the boundaries defined by DO-236A.

As described above, when a holding pattern is the next leg or the hold has just become the active leg, the FMS determines the hold entry type that it will fly to establish the aircraft on the holding pattern. When a holding pattern is the next leg or a holding pattern has just become the active leg, the FMS determines INBOUND DELTA as the difference between the previous leg course and the holding pattern oval inbound course. The FMS will use INBOUND DELTA to determine holding pattern entry type. When the next leg is a holding pattern and regardless of the defined entry type, the FMS constructs the entry path to make the most efficient use of the protected airspace. When the next leg is a holding pattern, the FMS will set the entry type of DIRECT TYPE 2 if the INBOUND DELTA is greater than or equal to 70 and less than 180 degrees.

FIG. 20 illustrates the TYPE 2 entry geometry and parameters associated with it. In a TYPE2 entry, the aircraft will remain wings level of the fix and will continue to fly the first segment, TYPE2_ENT, until it reaches the a tangent to a circular arc of the computed holding radius which is centered on the line connecting the turn centers of the holding pattern. The aircraft next flies the curved segment TYPE2_TURN until it reaches the outbound leg of the holding pattern. The aircraft flies the straight segment, TYPE2_OUTBOUND, until it reaches the third segment. The exact third segment flown will depend on the leg type.

For HA and HM, the aircraft flies a curved TYPE2_TURN2 segment until it reaches the straight segment TYPE2_INBOUND. When the aircraft sequences to the holding pattern, the entry is removed from the EFIS display and the aircraft is now on the holding pattern For HF, the aircraft flies a curved TYPE2_TURN2 segment until it reaches the TYPE2_INBOUND segment, which in this case is a CF leg. The aircraft will then sequence onto the CF leg and fly until it sequences the holding pattern fix. The entry is then removed from the EFIS display and the CF leg remains as the historical fix.

When flying a default leg time, the entry segments above can be re-sized if flying through 14,000 feet (climbing or descending), which causes the default leg time to change. The holding pattern and the entry segments will be re-sized if the aircraft is on the TYPE2_ENT segment, TYPE2_TURN1 segment or the TYPE2_OUTBOUND segment, and only if the entry magenta path is not taken away from the aircraft.

When the holding pattern is too short of a direct TYPE 2 entry to be flown inside of the holding pattern, the entry will be extended beyond turn 2. This extension will be limited to the 14k LIM which is determined by whether the aircraft is above 14,000 feet. When the aircraft is below 14,000 feet the extension is limited to a distance determined by a 1.0 minute inbound leg. When the aircraft is above 14,000 feet, he extension is limited to a distance determined by a 1.5 minute inbound leg.

Thus, when the holding pattern is TYPE 2, the FMS will compute direct type 2 entry when any of the following cases are met.

The first case is if the active leg is HA, HM or HF and the aircraft has sequenced the hold fix for the first time (holding pattern fix). This is the typically normal case.

The second case is met if the active leg is HA or HM, and the active leg segment is TYPE2_ENT or TYPE2_TURN1, and the aircraft is flying a default holding time, and the aircraft flies through 14,000 feet, and the TYPE2_ENT distance plus the roll anticipation distance is less than one-minute travel distance. This is a case that allow for resizing of the entry segment while flying through 14,000 feet.

The third case is met if the active leg is HA or HM, and the active leg segment is TYPE2_OUTBOUND, and the aircraft is flying a default holding time, and the aircraft flies through 14,000 feet, and the holding pattern racetrack outbound distance minus the remaining distance on the active segment is less than one-minute travel distance minus the roll anticipation distance. This is another case that allows for resizing of entry segment while flying through 14,000 feet. It should also be noted that HF legs are not resized when flying through 14,000.

When the active leg is HA, HM or HF and the entry type is TYPE 2, the FMS will compute the DEFAULT OUTBOUND leg length as:

$$LegLength = F \frac{(SH + SW)}{60} \qquad \text{Equation 59}$$

Where F is the 1.5 minute flag, and is equal to 1.5 minutes if the altitude is above 14,000 feet and 1.0 minutes if the altitude is below 14,000 feet, SH is the predicted hold speed in nautical miles per hour and SW is the inbound wind speed in the direction of the holding pattern inbound course.

When the active leg is HA, HM or HF, the FMS will compute the TYPE2_ENT distance (ENTD) as:

$$ENTD = \frac{HPR}{\left[\tan\frac{ID}{2}\right]} \qquad \text{Equation 60}$$

Where HPR is the holding pattern radius, ID is the INBOUND DELTA. When the entry segments cannot be flown inside the 14K limit, a disconnect will appear between the TYPE2_ENT segment and the TYPE2_TURN1 segment. This is done by setting the TYPE2_ENT segment equal to the 14K limit. If the holding pattern is too short for the entry segments to be flown inside the holding pattern, but there is enough room to fly the entry within the 14K limit, the aircraft minimizes the time and distance required to obtain the holding pattern fix versus flying the 14K limit.

When the active leg is HA, HM or HF, the FMS will compute the TYPE 2 ENTRY INBOUND distance (EID) as equal to the TYPE2_ENT segment plus the TYPE2_OUTBOUND segment.

The FMS will locate the ENTRY TURN POINT 1 a distance D at a bearing B from the hold fix, where D is equal to the TYPE 2_ENT distance and where B is defined as the desired inbound track. The desired inbound track is either the planned track from the prior leg into the hold fix from the flight plan if available or the current true track if no planned track from the leg to the hold fix from the flight plan is available.

The FMS will locate the ENTRY TURN CENTER 1 a distance D at a bearing B from the hold fix, where D is defined as:

$$D = \sqrt{[T2E]^2 + [HPR]^2} \qquad \text{Equation 61}$$

Where T2E is the TYPE2_ENT DISTANCE, and HPR is the HOLDING PATTERN RADIUS. And where bearing B is defined as:

$$B = IC + MAGVAR + RL\left(180 - \frac{ID}{2}\right) \qquad \text{Equation 62}$$

Where RL is +1 if the holding pattern turn direction is right, and −1 if the holding pattern turn direction is left, and where ID is the INBOUND DELTA.

The FMS will locate the ENTRY TURN POINT2 a distance D and a bearing B from the hold fix, where D is defined as:

$$D = \sqrt{[T2E]^2 + [2*HPR]^2} \qquad \text{Equation 63}$$

Where T2D is the TYPE2_ENT DISTANCE, and HPR is the HOLDING PATTERN RADIUS. And where bearing B is defined as:

$$B = IC + MAGVAR + RL\left(\arctan\left[\frac{2*HPR}{T2E}\right]\right) \qquad \text{Equation 64}$$

Where RL is +1 if the holding pattern turn direction is right, and −1 if the holding pattern turn direction is left, and where HPR is the holding pattern radius, and where T2E is the TYPE2_ENT DISTANCE.

The FMS will locate the ENTRY TURN POINT 3 a distance D and a bearing B from the hold fix, where D is defined as:

$$D = \sqrt{[2*HPR]^2 + [T2E]^2} \qquad \text{Equation 65}$$

Where T2E is the TYPE2_ENT DISTANCE, and HPR is the HOLDING PATTERN RADIUS. And where bearing B is defined as:

$$B=IC+MAGVAR+RL(180-A) \qquad \text{Equation 66}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = \arctan\left(\frac{2*HPR}{T2E}\right) \qquad \text{Equation 67}$$

Where HPR is the HOLDING PATTERN RADIUS and T2E is the TYPE2_ENT DISTANCE. It should be noted that on an extended TYPE2 entry, the ENTRY TURN POINT 2 and the ENTRY TURN POINT 3 will be equal.

The FMS will locate the ENTRY TURN CENTER 2 a distance D and a bearing B from the hold fix, where D is defined as:

$$D=\sqrt{[HPR]^2+[T2E]^2} \qquad \text{Equation 68}$$

Where T2E is the TYPE2_ENT DISTANCE, and HPR is the HOLDING PATTERN RADIUS. And where bearing B is defined as:

$$B=IC+MAGVAR+RL(180-A) \qquad \text{Equation 69}$$

Where RL is +1 if the holding pattern turn direction is right, and −1 if the holding pattern turn direction is left, where IC is the holding pattern inbound course, where MAGVAR is the magnetic variation between true north an magnetic north, and where A is defined as:

$$A = \arctan\left(\frac{HPR}{T2E}\right) \qquad \text{Equation 70}$$

Thus, the present invention provides a flight management system and method that determines segment sequencing during entry into holding patterns and the holding patterns themselves. The flight management system and method monitors the aircraft's progress along the active segment of the flight plan to determine what is the appropriate next segment and when to switch control from the active segment to the next segment. The flight management system can determine the appropriate next segment for the aircraft based on a variety of factors. These factors including aircraft position relative to a wayline, the existence of any cross track error, and whether or not the projected aircraft track will intersect an active segment. Preferably, the flight management system evaluates the aircraft state parameters at each wayline crossing to determine which segment is appropriate to control to next. If none of the segments are appropriate, then the control is defaulted to a default segment.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

APPENDIX 1

C1
1. LNAV Engaged
2. LEG_DIST_SEGMENT_TO_GO<0

C2
1. LNAV is disengaged.
2. LEG_DIST_SEGMENT_TO_GO < 0.
3. |LG_XTRKE| < LG_HX_TURN_RADIUS
or
1. LNAV is disengaged.
2. LEG_DIST_SEGMENT_TO_GO < 0.
3. LG_HX_TURN_RADIUS <= |LG_XTRKE| < 21 nm.
4. LG_SEG_ONTRACK_TO is TURN1.

C3
1. LNAV is disengaged.
2. LEG_DIST_SEGMENT_TO_GO < 0.
3. LG_HX_TURN_RADIUS <= |LG_XTRKE| < 21 nm.
4. LG_SEG_ONTRACK_TO is OUTBOUND.

C4
1. LNAV is disengaged.
2. LEG_DIST_SEGMENT_TO_GO < 0.
3. LG_HX_TURN_RADIUS <= |LG_XTRKE| < 21 nm.
4. LG_SEG_ONTRACK_TO is TURN2.

C5
1. LNAV is disengaged.
2. LEG_DIST_SEGMENT_TO_GO < 0.
3. LG_HX_TURN_RADIUS <= |LG_XTRKE| < 21 nm.
4. LG_SEG_ONTRACK_TO is INBOUND.

C6
1. LNAV is engaged.
2. LEG_DIST_SEGMENT_TO_GO < 0.

C7
1. LNAV is disengaged.
2. LEG_DIST_SEGMENT_TO_GO < 0.
3. |LG_XTRKE| < LG_HX_TURN_RADIUS
or
1. LNAV is disengaged.
2. LG_HX_TURN_RADIUS <= |LG_XTRKE| < 21 nm
3. LG_SEG_ONTRACK_TO is OUTBOUND.

C8
1. LNAV is disengaged.
2. LG_HX_TURN_RADIUS <= | LG_XTRKE | <21 nm
3. LG_SEG_ONTRACK_TO is TURN2

C9
1. LNAV is disengaged.
2. LG_HX_TURN_RADIUS <= | LG_XTRKE | <21 nm
3. LG_SEG_ONTRACK_TO is INBOUND.

C10
1. LNAV is engaged.
2. LEG_DIST_SEGMENT_TO_GO < 0.

C11
1. LNAV is disengaged.
2. LEG_DIST_SEGMENT_TO_GO < 0.
3. |LG_XTRKE| < LG_HX_TURN_RADIUS
or
1. LNAV is disengaged.
2. LG_HX_TURN_RADIUS <= | LG_XTRKE | <21 nm
3. LG_SEG_ONTRACK_TO is TURN2.

C12
1. LNAV is disengaged.
2. LG_HX_TURN_RADIUS <= | LG_XTRKE | <21 nm
3. LG_SEG_ONTRACK_TO is INBOUND.

C13
1. LNAV is engaged.
2. LEG_DIST_SEGMENT_TO_GO < 0.

C14
1. LNAV is disengaged.
2. LEG_DIST_SEGMENT_TO_GO < 0.
3. |LG_XTRKE| < LG_HX_TURN_RADIUS.
or
1. LNAV is disengaged.
2. LG_HX_TURN_RADIUS <= | LG_XTRKE | <21 nm
3. LG_SEG_ONTRACK_TO is INBOUND.

C15
1. LNAV is engaged.
2. LEG_DIST_SEGMENT_TO_GO < 0.
3. LG_HOLD_SEQUENCE_ARMED is false.

C16
1. LNAV is disengaged.
2. LEG_DIST_SEGMENT_TO_GO < 0.
3. |LG_XTRKE| < LG_HX_TURN_RADIUS.
4. LG_HOLD_SEQUENCE_ARMED is false.
or
1. LNAV is disengaged.
2. LG_HX_TURN_RADIUS <= | LG_XTRKE | <21 nm
3. LG_SEG_ONTRACK_TO is TURN1.
4. LG_HOLD_SEQUENCE_ARMED is false.

C17
1. LNAV is disengaged.
2. |LG_XTRKE| >= 21 nm

APPENDIX 2

| | |
|---|---|
| C1 | 1. LNAV Engaged<br>2. LEG_DIST_SEGMENT_TO_GO<0 |
| C2 | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is TEARDROP_TURN1. |
| C3 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is TEARDROP_OUTBOUND. |
| C4 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is TEARDROP_TURN2. |
| C5 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is TEARDROP_INBOUND.<br>5. LG_LEG_TYPE is HM or HA |
| C6 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is INBOUND.<br>5. LG_LEG_TYPE is HM or HA |
| C7 | 1. LNAV is engaged.<br>2. LEG_DIST_SEGMENT_TO_GO < 0. |
| C8 | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LG_HX_TURN_RADIUS <= \|LG_XTRKE\| < 21 nm<br>3. LG_SEG_ONTRACK_TO is TEARDROP_OUTBOUND. |
| C9 | 1. LNAV is disengaged.<br>2. LG_HX_TURN_RADIUS <= \| LG_XTRKE \| <21 nm<br>3. LG_SEG_ONTRACK_TO is TEARDROP_TURN2 |
| C10 | 1. LNAV is disengaged.<br>2. LG_HX_TURN_RADIUS <= \| LG_XTRKE \| <21 nm<br>3. LG_SEG_ONTRACK_TO is TEARDROP_INBOUND.<br>4. LG_LEG_TYPE is HM or HA |
| C11 | 1. LNAV is disengaged.<br>2. LG_HX_TURN_RADIUS <= \| LG_XTRKE \| <21 nm<br>3. LG_SEG_ONTRACK_TO is INBOUND.<br>4. LG_LEG_TYPE is HM or HA |
| C12 | 1. LNAV is engaged.<br>2. LEG_DIST_SEGMENT_TO_GO < 0. |
| C13 | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LG_HX_TURN_RADIUS <= \| LG_XTRKE \| <21 nm<br>3. LG_SEG_ONTRACK_TO is TEARDROP_TURN2. |
| C14 | 1. LNAV is disengaged.<br>2. LG_HX_TURN_RADIUS <= \| LG_XTRKE \| <21 nm<br>3. LG_SEG_ONTRACK_TO is TEARDROP_INBOUND. |
| C15 | 1. LNAV is disengaged.<br>2. LG_HX_TURN_RADIUS <= \|LG_XTRKE\| < 21 nm.<br>3. LG_SEG_ONTRACK_TO is INBOUND.<br>4. LG_LEG_TYPE is HM or HA. |
| C16 | 1. LNAV is engaged.<br>2. LEG_DIST_SEGMENT_TO_GO < 0.<br>3. LG_LEG_TYPE is HM or HA. |
| C17 | 1. LNAV is disengaged.<br>2. LEG_DIST_SEGMENT_TO_GO < 0.<br>3. \|LG_XTRKE\| < LG_HX_TURN_RADIUS.<br>4. LG_LEG_TYPE is HM or HA.<br>or<br>1. LNAV is disengaged.<br>2. LG_HX_TURN_RADIUS <= \| LG_XTRKE \| <21 nm<br>3. LG_SEG_ONTRACK_TO is TEARDROP_INBOUND.<br>4. LG_LEG_TYPE is HM or HA. |
| C18 | 1. LNAV is disengaged.<br>2. LG_HX_TURN_RADIUS <= \|LG_XTRKE\| < 21 nm.<br>3. LG_SEG_ONTRACK_TO is INBOUND. |

APPENDIX 2-continued

| | |
|---|---|
| | 4. LG_LEG_TYPE is HM or HA. |
| C19 | 1. LNAV is disengaged.<br>2. LG_HX_TURN_RADIUS <= \|LG_XTRKE\| < 21 nm.<br>3. LG_SEG_ONTRACK_TO is INBOUND. |
| C20 | 1. LNAV is disengaged.<br>2. \|LG_XTRKE\| >= 21 nm<br>3. LG_LEG_TYPE is HM or HA. |
| C21 | 1. LNAV is disengaged.<br>2. \|LG_XTRKE\| >= 21 nm<br>3. LG_LEG_TYPE is HF. |

APPENDIX 3

| | |
|---|---|
| C1 | 1. LNAV Engaged<br>2. LEG_DIST_SEGMENT_TO_GO<0 |
| C2 | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is PARALLEL_TURN1. |
| C3 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is PARALLEL_OUTBOUND. |
| C4 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is PARALLEL_TURN2. |
| C5 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is PARALLEL_INBOUND.<br>5. LG_LEG_TYPE is HM or HA |
| C6 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is PARALLEL_TURN3.<br>5. LG_LEG_TYPE is HM or HA |
| C7 | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is INBOUND.<br>5. LG_LEG_TYPE is HM or HA |
| C8 | 1. LNAV is engaged.<br>2. LEG_DIST_SEGMENT_TO_GO < 0. |
| C9 | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LG_HX_TURN_RADIUS <= \|LG_XTRKE\| < 21 nm<br>3. LG_SEG_ONTRACK TO is PARALLEL_OUTBOUND. |
| C10 | 1. LNAV is disengaged.<br>2. LG_HX_TURN_RADIUS <= \| LG_XTRKE \| <21 nm<br>3. LG_SEG_ONTRACK_TO is PARALLEL_TURN2 |
| C11 | 1. LNAV is disengaged.<br>2. LG_HX_TURN_RADIUS <= \| LG_XTRKE \| <21 nm<br>3. LG_SEG_ONTRACK_TO is PARALLEL_INBOUND.<br>4. LG_LEG_TYPE is HM or HA |
| C12 | 1. LNAV is disengaged.<br>2. LG_HX_TURN_RADIUS <= \| LG_XTRKE \| <21 nm<br>3. LG_SEG_ONTRACK_TO is PARALLEL_TURN3<br>4. LG_LEG_TYPE is HM or HA |
| C13 | 1. LNAV is disengaged.<br>2. LG_HX_TURN_RADIUS <= \| LG_XTRKE \| <21 nm<br>3. LG_SEG_ONTRACK_TO is INBOUND.<br>4. LG_LEG_TYPE is HM or HA |
| C14 | 1. LNAV is engaged.<br>2. LEG_DIST_SEGMENT_TO_GO < 0. |
| C15 | 1. LNAV is disengaged.<br>2. LEG_DIST_SEGMENT_TO_GO < 0.<br>3. \|LG_XTRKE\| < LG_HX_TURN_RADIUS<br>or |

APPENDIX 3-continued

|     |                                                                                                                                                                 |
| --- | --------------------------------------------------------------------------------------------------------------------------------------------------------------- |
|     | 1. LNAV is disengaged.<br>2. LG_HX_TURN_RADIUS <= \| LG_XTRKE \| <21 nm<br>3. LG_SEG_ONTRACK_TO is PARALLEL_TURN2.                                               |
| C16 | 1. LNAV is disengaged.<br>2. LG_HX_TURN_RADIUS <= \| LG_XTRKE \| <21 nm<br>3. LG_SEG_ONTRACK_TO is PARALLEL_INBOUND.                                             |
| C17 | 1. LNAV is disengaged.<br>2. LG_HX_TURN_RADIUS <= \|LG_XTRKE\| < 21 nm.<br>3. LG_SEG_ONTRACK_TO is PARELLEL_TURN3.<br>4. LG_LEG_TYPE is HM or HA.                |
| C18 | 1. LNAV is disengaged.<br>2. LG_HX_TURN_RADIUS <= \|LG_XTRKE\| < 21 nm.<br>3. LG_SEG_ONTRACK_TO is INBOUND.<br>4. LG_LEG_TYPE is HM or HA.                       |
| C19 | 1. LNAV is engaged.<br>2. LEG_DIST_SEGMENT_TO_GO < 0.                                                                                                            |
| C20 | 1. LNAV is disengaged.<br>2. LEG_DIST_SEGMENT_TO_GO < 0.<br>3. \|LG_XTRKE\| < LG_HX_TURN_RADIUS.<br>or<br>1. LNAV is disengaged.<br>2. LG_HX_TURN_RADIUS <= \| LG_XTRKE \| <21 nm<br>3. LG_SEG_ONTRACK_TO is PARALLEL_INBOUND. |
| C21 | 1. LNAV is disengaged.<br>2. LG_HX_TURN_RADIUS <= \|LG_XTRKE\| < 21 nm.<br>3. LG_SEG_ONTRACK_TO is PARALLEL_TURN3.<br>4. LG_LEG_TYPE is HM or HA.                |
| C22 | 1. LNAV is disengaged.<br>2. LG_HX_TURN_RADIUS <= \|LG_XTRKE\| < 21 nm.<br>3. LG_SEG_ONTRACK_TO is INBOUND.<br>4. LG_LEG_TYPE is HM or HA.                       |
| C23 | 1. LNAV is engaged.<br>2. LEG_DIST_SEGMENT_TO_GO < 0.                                                                                                            |
| C24 | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LG_HX_TURN_RADIUS <= \| LG_XTRKE \| <21 nm<br>3. LG_SEG_ONTRACK_TO is PARALLEL_TURN3 |
| C25 | 1. LNAV is disengaged.<br>2. LG_HX_TURN_RADIUS <= \|LG_XTRKE\| < 21 nm.<br>3. LG_SEG_ONTRACK_TO is INBOUND.<br>4. LG_LEG_TYPE is HM or HA.                       |
| C26 | 1. LNAV is disengaged.<br>2. LG_HX_TURN_RADIUS <= \|LG_XTRKE\| < 21 nm.<br>3. LG_SEG_ONTRACK_TO is INBOUND.                                                      |
| C27 | 1. LNAV is disengaged.<br>2. \|LG_XTRKE\| >= 21 nm<br>3. LG_LEG_TYPE is HM or HA.                                                                                |
| C28 | 1. LNAV is disengaged.<br>2. \|LG_XTRKE\| >= 21 nm<br>3. LG_LEG_TYPE is HF.                                                                                      |

APPENDIX 4

|     |                                                                                                                                                                                         |
| --- | --------------------------------------------------------------------------------------------------------------------------------------------------------------------------------------- |
| C1  | 1. LNAV Engaged<br>2. LEG_DIST_SEGMENT_TO_GO<0                                                                                                                                          |
| C2  | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is TYPE1_TURN1. |
| C3  | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is TYPE1_OUTBOUND.                                     |
| C4  | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is TYPE1_TURN2.                                        |
| C5  | 1. LNAV is disengaged.<br>2. LEG_DIST_SEGMENT_TO_GO < 0.                                                                                                                                |

APPENDIX 4-continued

|     |                                                                                                                                                                                         |
| --- | --------------------------------------------------------------------------------------------------------------------------------------------------------------------------------------- |
|     | 3. LG_HX_TURN_RADIUS <= \|LG_XTRKE\| < 21 nm.<br>4. LG_SEG_ONTRACK_TO is TYPE1_INBOUND.<br>5. LG_LEG_TYPE is HM or HA                                                                    |
| C6  | 1. LNAV is disengaged.<br>2. LEG_DIST_SEGMENT_TO_GO < 0.<br>3. LG_HX_TURN_RADIUS <= \|LG_XTRKE\| < 21 nm.<br>4. LG_SEG_ONTRACK_TO is INBOUND.<br>5. LG_LEG_TYPE is HM or HA              |
| C7  | 1. LNAV is engaged.<br>2. LEG_DIST_SEGMENT_TO_GO < 0.                                                                                                                                   |
| C8  | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LG_HX_TURN_RADIUS <= \|LG_XTRKE\| < 21 nm.<br>3. LG_SEG_ONTRACK_TO is TYPE1_OUTBOUND. |
| C9  | 1. LNAV is disengaged.<br>2. LG_HX_TURN_RADIUS <= \| LG_XTRKE \| <21 nm<br>3. LG_SEG_ONTRACK_TO is TYPE1_TURN2                                                                           |
| C10 | 1. LNAV is disengaged.<br>2. LG_HX_TURN_RADIUS <= \| LG_XTRKE \| <21 nm<br>3. LG_SEG_ONTRACK_TO is TYPE1_INBOUND.<br>4. LG_LEG_TYPE is HM or HA                                          |
| C11 | 1. LNAV is disengaged.<br>2. LG_HX_TURN_RADIUS <= \| LG_XTRKE \| <21 nm<br>3. LG_SEG_ONTRACK_TO is INBOUND.<br>4. LG_LEG_TYPE is HM or HA                                                |
| C12 | 1. LNAV is engaged.<br>2. LEG_DIST_SEGMENT_TO_GO < 0.                                                                                                                                   |
| C13 | 1. LNAV is disengaged.<br>2. LEG_DIST_SEGMENT_TO_GO < 0.<br>3. \|LG_XTRKE\| < LG_HX_TURN_RADIUS<br>or<br>1. LNAV is disengaged.<br>2. LG_HX_TURN_RADIUS <= \| LG_XTRKE \| <21 nm<br>3. LG_SEG_ONTRACK_TO is TYPE1_TURN2. |
| C14 | 1. LNAV is disengaged.<br>2. LG_HX_TURN_RADIUS <= \| LG_XTRKE \| <21 nm<br>3. LG_SEG_ONTRACK_TO is TYPE1_INBOUND.                                                                        |
| C15 | 1. LNAV is disengaged.<br>2. LG_HX_TURN_RADIUS <= \|LG_XTRKE\| < 21 nm.<br>3. LG_SEG_ONTRACK_TO is INBOUND.<br>4. LG_LEG_TYPE is HM or HA.                                               |
| C16 | 1. LNAV is engaged.<br>2. LEG_DIST_SEGMENT_TO_GO < 0.<br>3. LG_LEG_TYPE is HM or HA.                                                                                                    |
| C17 | 1. LNAV is disengaged.<br>2. LEG_DIST_SEGMENT_TO_GO < 0.<br>3. \|LG_XTRKE\| < LG_HX_TURN_RADIUS.<br>4. LG_LEG_TYPE is HM or HA.<br>or<br>1. LNAV is disengaged.<br>2. LG_HX_TURN_RADIUS <= \| LG_XTRKE \| <21 nm<br>3. LG_SEG_ONTRACK_TO is TYPE1_INBOUND.<br>4. LG_LEG_TYPE is HM or HA. |
| C18 | 1. LNAV is disengaged.<br>2. LG_HX_TURN_RADIUS <= \|LG_XTRKE\| < 21 nm.<br>3. LG_SEG_ONTRACK_TO is INBOUND.<br>4. LG_LEG_TYPE is HM or HA.                                               |
| C19 | 1. LNAV is disengaged.<br>2. LG_HX_TURN_RADIUS <= \|LG_XTRKE\| < 21 nm.<br>3. LG_SEG_ONTRACK_TO is INBOUND.                                                                              |
| C20 | 1. LNAV is disengaged.<br>2. \|LG_XTRKE\| >= 21 nm<br>3. LG_LEG_TYPE is HM or HA.                                                                                                       |
| C21 | 1. LNAV is disengaged.<br>2. \|LG_XTRKE\| >= 21 nm<br>3. LG_LEG_TYPE is HF.                                                                                                             |

APPENDIX 5

|     |                                                              |
| --- | ------------------------------------------------------------ |
| C1  | 1. LNAV Engaged<br>2. LEG_DIST_SEGMENT_TO_GO<0               |
| C2  | 1. LNAV is disengaged.<br>2. LEG_DIST_SEGMENT_TO_GO < 0.     |

APPENDIX 5-continued

```
      3. |LG_XTRKE| < LG_HX_TURN_RADIUS
         or
         1. LNAV is disengaged.
         2. LEG_DIST_SEGMENT_TO_GO < 0.
         3. LG_HX_TURN_RADIUS <= |LG_XTRKE| < 21 nm.
         4. LG_SEG_ONTRACK_TO is TYPE2_ENT.
C3       1. LNAV is disengaged.
         2. LEG_DIST_SEGMENT_TO_GO < 0.
         3. LG_HX_TURN_RADIUS <= |LG_XTRKE| < 21 nm.
         4. LG_SEG_ONTRACK_TO is TYPE2_TURN1
C4       1. LNAV is disengaged.
         2. LEG_DIST_SEGMENT_TO_GO < 0.
         3. LG_HX_TURN_RADIUS <= |LG_XTRKE| < 21 nm.
         4. LG_SEG_ONTRACK_TO is TYPE2_OUTBOUND.
C5       1. LNAV is disengaged.
         2. LEG_DIST_SEGMENT_TO_GO < 0.
         3. LG_HX_TURN_RADIUS <= |LG_XTRKE| < 21 nm.
         4. LG_SEG_ONTRACK_TO is TYPE2_TURN2.
         5. LG_LEG_TYPE is HM or HA
C6       1. LNAV is disengaged.
         2. LEG_DIST_SEGMENT_TO_GO < 0.
         3. LG_HX_TURN_RADIUS <= |LG_XTRKE| < 21 nm.
         4. LG_SEG_ONTRACK_TO is TYPE2_INBOUND.
         5. LG_LEG_TYPE is HM or HA
C7       1. LNAV is disengaged.
         2. LEG_DIST_SEGMENT_TO_GO < 0.
         3. LG_HX_TURN_RADIUS <= |LG_XTRKE| < 21 nm.
         4. LG_SEG_ONTRACK_TO is INBOUND.
         5. LG_LEG_TYPE is HM or HA
C8       1. LNAV is engaged.
         2. LEG_DIST_SEGMENT_TO_GO < 0.
C9       1. LNAV is disengaged.
         2. LEG_DIST_SEGMENT_TO_GO < 0.
         3. |LG_XTRKE| < LG_HX_TURN_RADIUS
         or
         1. LNAV is disengaged.
         2. LG_HX_TURN_RADIUS <= |LG_XTRKE| < 21 nm
         3. LG_SEG_ONTRACK_TO is TYPE2_TURN1.
C10      1. LNAV is disengaged.
         2. LG_HX_TURN_RADIUS <= | LG_XTRKE | <21 nm
         3. LG_SEG_ONTRACK_TO is TYPE2_OUTBOUND
C11      1. LNAV is disengaged.
         2. LG_HX_TURN_RADIUS <= | LG_XTRKE | <21 nm
         3. LG_SEG_ONTRACK_TO is TYPE2_TURN2.
C12      1. LNAV is disengaged.
         2. LG_HX_TURN_RADIUS <= | LG_XTRKE | <21 nm
         3. LG_SEG_ONTRACK_TO is TYPE2_INBOUND
         4. LG_LEG_TYPE is HM or HA
C13      1. LNAV is disengaged.
         2. LG_HX_TURN_RADIUS <= | LG_XTRKE | <21 nm
         3. LG_SEG_ONTRACK_TO is INBOUND.
         4. LG_LEG_TYPE is HM or HA
C14      1. LNAV is engaged.
         2. LEG_DIST_SEGMENT_TO_GO < 0.
C15      1. LNAV is disengaged.
         2. LEG_DIST_SEGMENT_TO_GO < 0.
         3. |LG_XTRKE| < LG_HX_TURN_RADIUS
         or
         1. LNAV is disengaged.
         2. LG_HX_TURN_RADIUS <= | LG_XTRKE | <21 nm
         3. LG_SEG_ONTRACK_TO is TYPE2_OUTBOUND.
C16      1. LNAV is disengaged.
         2. LG_HX_TURN_RADIUS <= | LG_XTRKE | <21 nm
         3. LG_SEG_ONTRACK_TO is TYPE2_TURN2.
C17      1. LNAV is disengaged.
         2. LG_HX_TURN_RADIUS <= |LG_XTRKE| < 21 nm.
         3. LG_SEG_ONTRACK_TO is TYPE2_INBOUND.
         4. LG_LEG_TYPE is HM or HA.
C18      1. LNAV is disengaged.
         2. LG_HX_TURN_RADIUS <= |LG XTRKE| < 21 nm.
         3. LG_SEG_ONTRACK_TO is INBOUND.
         4. LG_LEG_TYPE is HM or HA.
C19      1. LNAV is engaged.
         2. LEG_DIST_SEGMENT_TO_GO < 0.
C20      1. LNAV is disengaged.
         2. LEG_DIST_SEGMENT_TO_GO < 0.
         3. |LG_XTRKE| < LG_HX_TURN_RADIUS.
         or
         1. LNAV is disengaged.
         2. LG_HX_TURN_RADIUS <= | LG_XTRKE | <21 nm
         3. LG_SEG_ONTRACK_TO is TYPE2_TURN2
C21      1. LNAV is disengaged.
         2. LG_HX_TURN_RADIUS <= |LG_XTRKE| < 21 nm.
         3. LG_SEG_ONTRACK_TO is TYPE2_INBOUND.
         4. LG_LEG_TYPE is HM or HA.
C22      1. LNAV is disengaged.
         2. LG_HX_TURN_RADIUS <= |LG_XTRKE| < 21 nm.
         3. LG_SEG_ONTRACK_TO is INBOUND.
         4. LG_LEG_TYPE is HM or HA.
C23      1. LNAV is engaged.
         2. LEG_DIST_SEGMENT_TO_GO < 0.
C24      1. LNAV is disengaged.
         2. LEG_DIST_SEGMENT_TO_GO < 0.
         3. |LG_XTRKE| < LG_HX_TURN_RADIUS
         or
         1. LNAV is disengaged.
         2. LG_HX_TURN_RADIUS <= | LG_XTRKE | <21 nm
         3. LG_SEG_ONTRACK_TO is TYPE2_INBOUND
C25      1. LNAV is disengaged.
         2. LG_HX_TURN_RADIUS <= |LG_XTRKE| < 21 nm.
         3. LG_SEG_ONTRACK_TO is INBOUND.
         4. LG_LEG_TYPE is HM or HA.
C26      1. LNAV is disengaged.
         2. LG_HX_TURN_RADIUS <= |LG_XTRKE| < 21 nm.
         3. LG_SEG_ONTRACK_TO is INBOUND.
C27      1. LNAV is disengaged.
         2. |LG_XTRKE| >= 21 nm
         3. LG_LEG_TYPE is HM or HA.
C28      1. LNAV is disengaged.
         2. |LG_XTRKE| >= 21 nm
         3. LG_LEG_TYPE is HF.
```

The invention claimed is:

1. A flight management system, the flight management system comprising:
   a) hold entry algorithm for a teardrop holding pattern entry, the hold entry algorithm including:
      i) a teardrop turn 1 segment;
      ii) a teardrop outbound segment following the teardrop turn 1 segment, the teardrop outbound segment having a length equal to the smaller of a hold racetrack outbound distance and a default leg distance, and wherein if the outbound segment length is less than a defined minimum distance the outbound segment length is extended to the greater of the hold racetrack outbound distance or the default leg length distance;
      iii) a teardrop turn 2 segment following the teardrop outbound segment; and
      iv) a teardrop inbound segment following the teardrop turn 2 segment; and
   b) a sequencing system, the sequencing system storing the hold entry algorithm and monitoring aircraft progress along an active segment in the hold entry algorithm the sequencing system evaluating the teardrop turn 1 segment, the teardrop outbound segment, the teardrop turn 2 segment and the teardrop inbound segment to determine which segment meets a control criterion, the sequencing system controlling to selected segments from the plurality of segments as the selected segments meet the control criterion.

2. The flight management system of claim 1 wherein the teardrop turn 1 segment comprises a non-standard curved path transition having a radius different than a radius of a racetrack holding pattern, and wherein the teardrop turn 2 segment has a radius equal to a racetrack holding pattern radius.

3. The flight management system of claim 1 wherein the defined minimum distance comprises a required roll anticipation distance.

4. The flight management system of claim 1 wherein the teardrop inbound segment is calculated to reflect extension of the teardrop outbound segment.

5. The flight management system of claim 1 wherein the default leg distance is defined as:

$$F\frac{(SH+SW)}{60},$$

where is a F is the 1.5 minute flag, and is equal to 1.5 minutes if the altitude is above 14,000 feet and 1.0 minutes if the altitude is below 14,000 feet, SH is the predicted hold speed in nautical miles per hour and SW is the inbound wind speed in the direction of the holding pattern inbound course.

6. The flight management system of claim 1 wherein the sequencing system sequences to a next segment when the aircraft is following the current segment within a specified error distance and when the aircraft crosses a wayline.

7. The flight management system of claim 1 wherein the sequencing system sequences to the next segment when the aircraft is following the current segment beyond the cent specified error distance and the aircraft is on track to intercept the next segment.

8. The flight management system of claim 1 wherein the current specified error distance is equal to a turn radius of a holding pattern.

9. A flight management system, the flight management system comprising:
   a) a hold entry algorithm for a teardrop holding pattern entry, the hold entry algorithm including:
      i) a parallel turn 1 segment;
      ii) a parallel outbound segment following the parallel turn 1 segment;
      iii) a parallel turn 2 segment following the parallel outbound segment;
      iv) a parallel inbound segment following the parallel turn 2 segment, the parallel inbound segment having an initial length set to the smaller of a default leg distance or a racetrack holding pattern leg length, and wherein the parallel outbound segment is extended to ensure that the parallel inbound segment has a length at least as long as the required roll anticipation distance; and
      v) a parallel turn 3 segment following the parallel inbound segment; and
   b) a sequencing system, the sequencing system storing the hold entry algorithm and monitoring aircraft progress along an active segment in the hold entry algorithm the sequencing system evaluating the parallel turn 1 segment, the parallel outbound segment, the parallel turn 2 segment, the parallel inbound segment and the parallel turn 3 segment to determine which segment meets a control criterion, the sequencing system controlling to selected segments from the plurality of segments as the selected segments meet the control criterion.

10. The flight management system of claim 9 wherein the parallel turn 2 segment has a radius equal to a racetrack holding pattern radius.

11. The flight management system of claim 9 wherein the parallel inbound segment has a length defined as $$\sqrt{[ETR2+(\sin(A1)*ETR2)]^2+[EOD-(\cos(A1)*ETR2)]^2} - \sqrt{[ETR2-(\sin(A1)*ETR2)]^2+[(\cos(A1)*ETR2)]^2}$$

where ETR2 is a turn radius of the parallel turn 2 segment and EOD is an entry outbound distance, and where angle A1 is defined as:

$$A1 = \arccos\left(\frac{2ETR2}{EOD}\right).$$

12. The flight management system of claim 9 wherein the default leg distance is defined as:

$$F\frac{(SH+SW)}{60},$$

where is a F is the 1.5 minute flag, and is equal to 1.5 minutes if the altitude is above 14,000 feet and 1.0 minutes if the altitude is below 14,000 feet, SH is the predicted hold speed in nautical miles per hour and SW is the inbound wind speed in the direction of the holding pattern inbound course.

13. The flight management system of claim 9 wherein the sequencing system sequences to a next segment when the aircraft is following the current segment within a specified error distance and when the aircraft crosses a wayline.

14. The flight management system of claim 9 wherein the sequencing system sequences to the next segment when the aircraft is following the current segment beyond the current specified error distance and the aircraft is on track to intercept the next segment.

15. The flight management system of claim 9 wherein the current specified error distance is equal to a turn radius of a holding pattern.

* * * * *